No. 615,343. Patented Dec. 6, 1898.
A. T. BROWN.
TYPE WRITING MACHINE.
(Application filed Dec. 1, 1894.)
(No Model.) 10 Sheets—Sheet 3.

WITNESSES: INVENTOR
Alex. T. Brown
By Jacob Felbel
ATTORNEY.

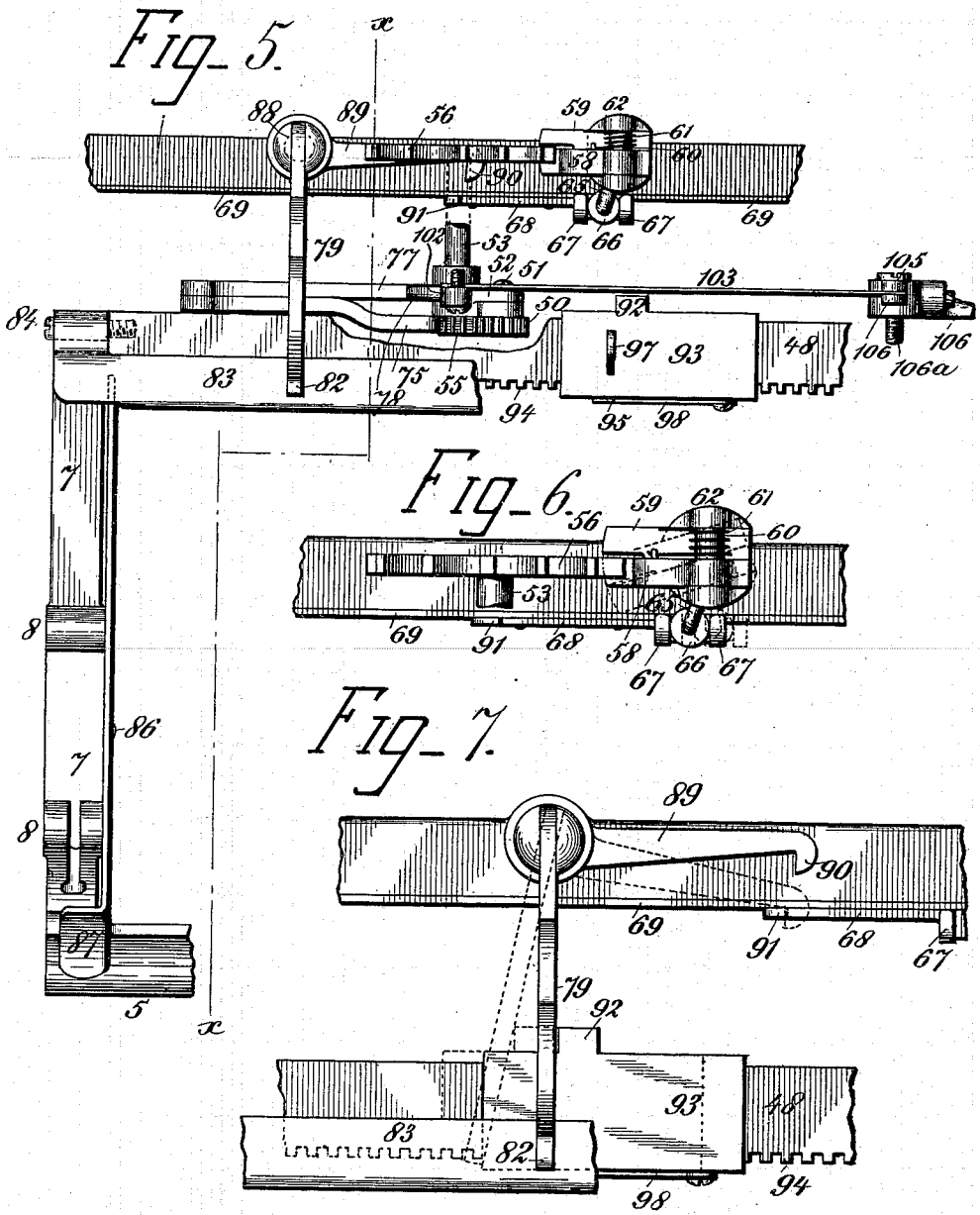

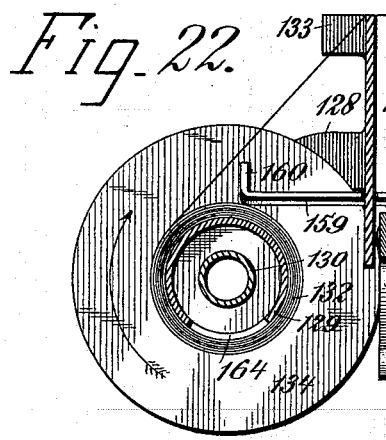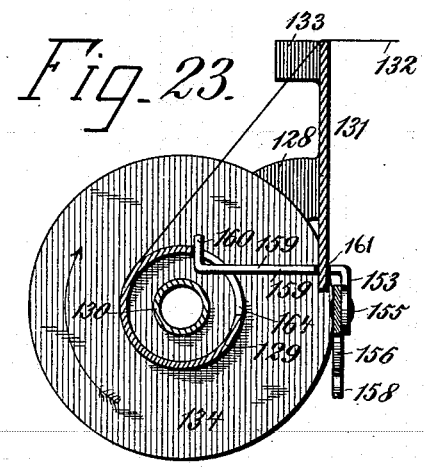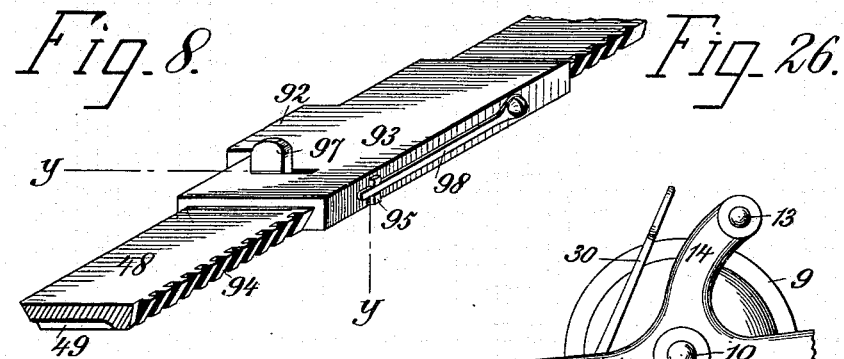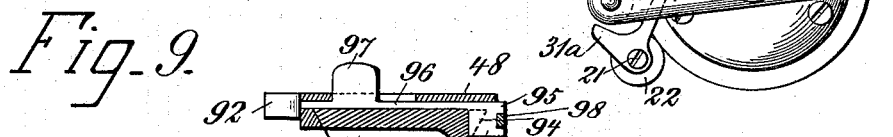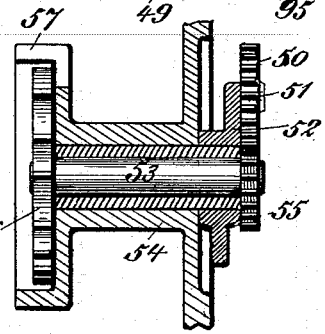

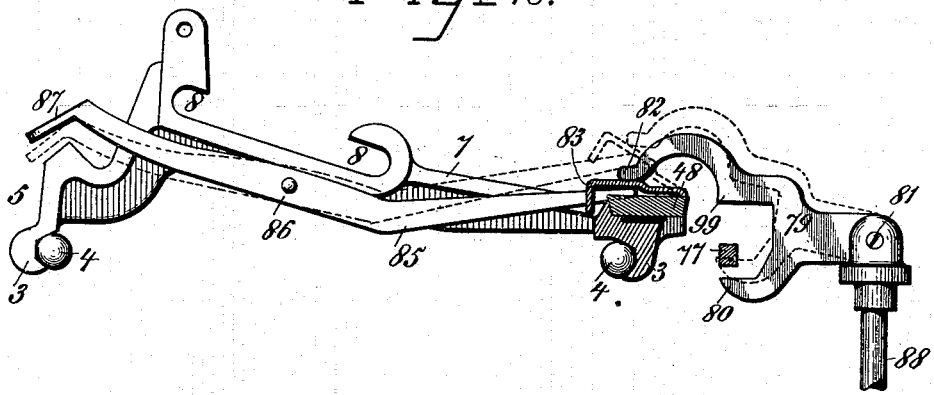

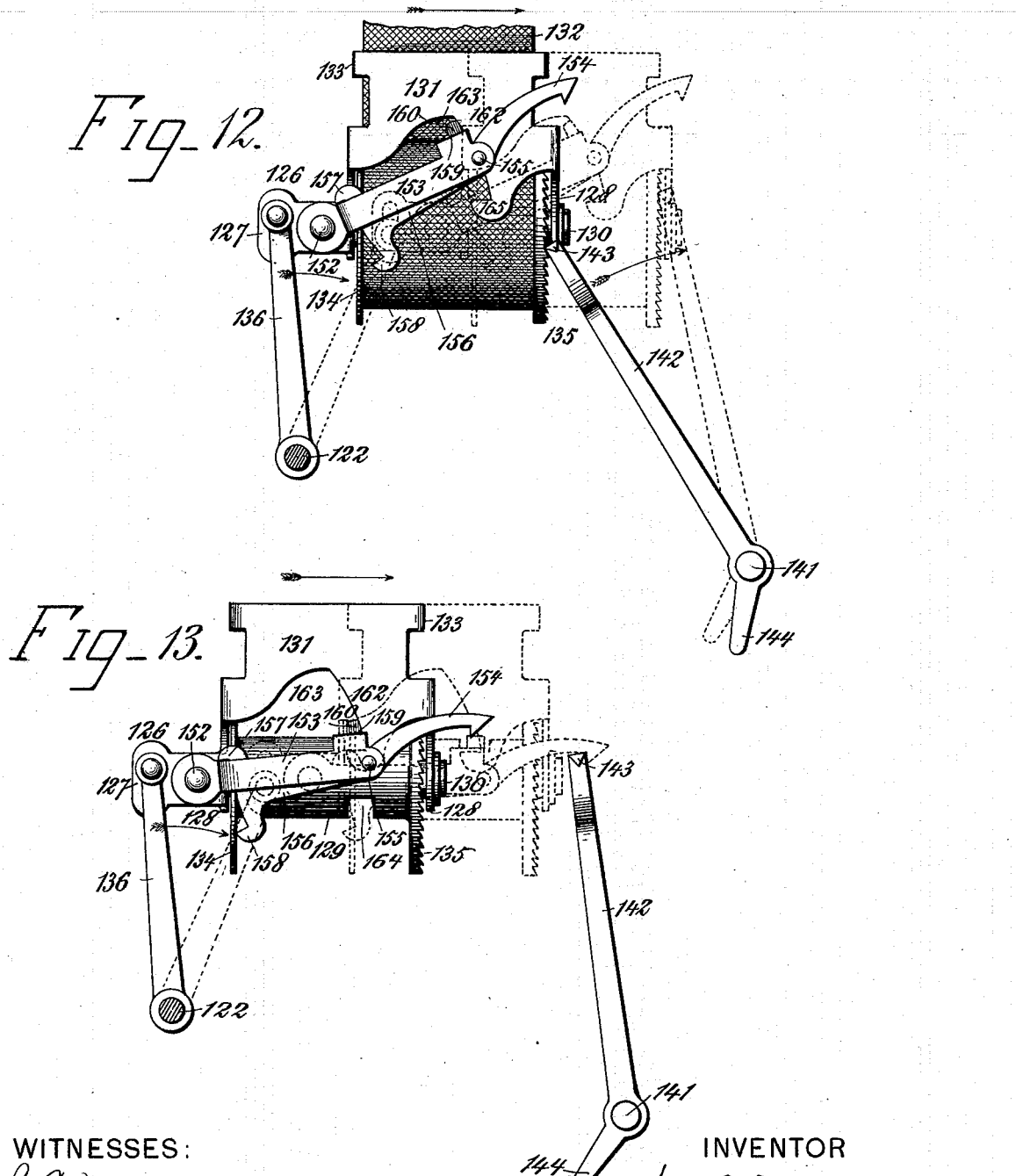

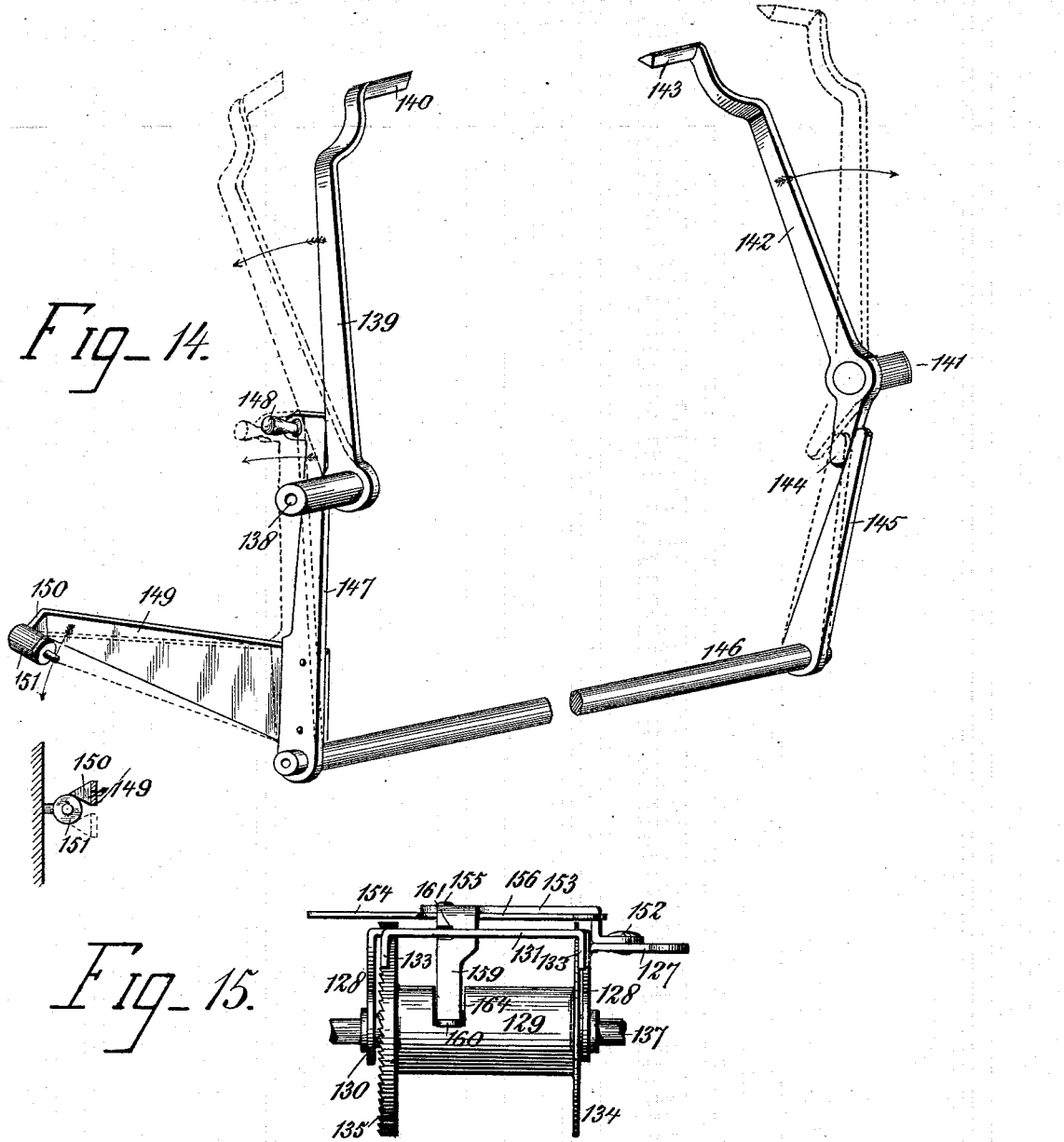

No. 615,343. Patented Dec. 6, 1898.
A. T. BROWN.
TYPE WRITING MACHINE.
(Application filed Dec. 1, 1894.)
(No Model.) 10 Sheets—Sheet 9.

WITNESSES:
J. C. Macdonald
D. H. Maynord

INVENTOR
Alex. T. Brown
By Jacob Felbel.
ATTORNEY

No. 615,343. Patented Dec. 6, 1898.
A. T. BROWN.
TYPE WRITING MACHINE.
(Application filed Dec. 1, 1894.)
(No Model.) 10 Sheets—Sheet 10.
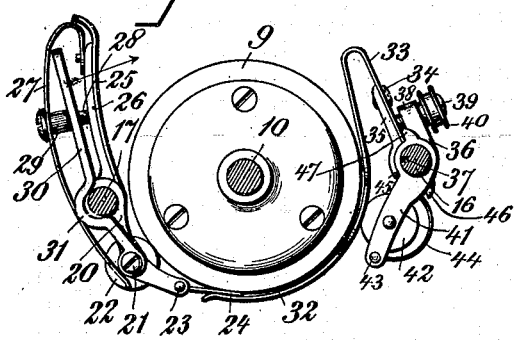
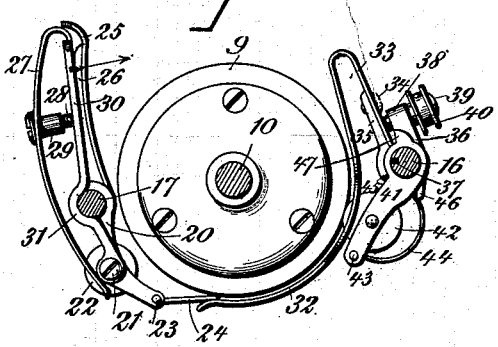
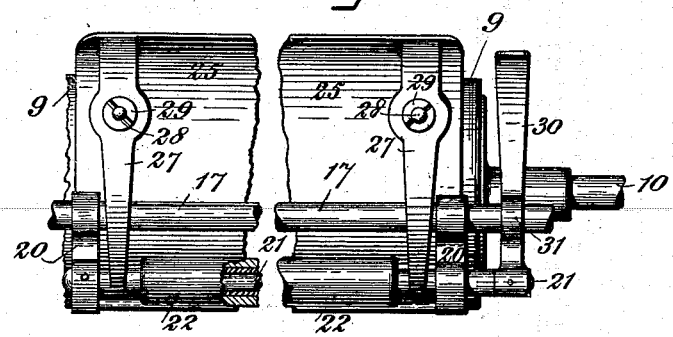
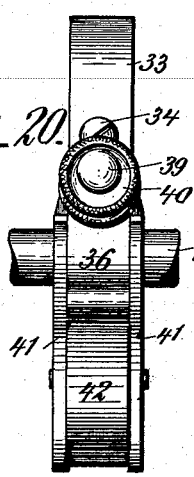
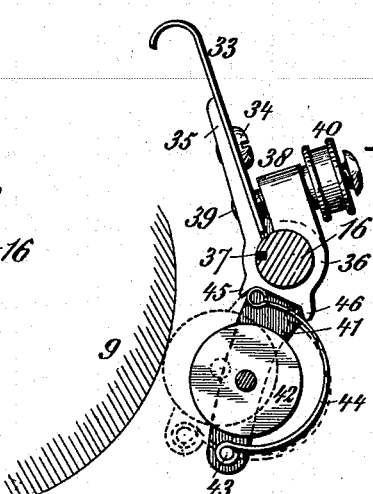
WITNESSES:
INVENTOR
Alex T. Brown
By Jacob Felbel
ATTORNEY.

UNITED STATES PATENT OFFICE.

ALEXANDER T. BROWN, OF SYRACUSE, NEW YORK.

TYPE-WRITING MACHINE.

SPECIFICATION forming part of Letters Patent No. 615,343, dated December 6, 1898.

Application filed December 1, 1894. Serial No. 530,540. (No model.)

*To all whom it may concern:*

Be it known that I, ALEXANDER T. BROWN, a citizen of the United States, and a resident of Syracuse, in the county of Onondaga and State of New York, have invented certain new and useful Improvements in Type-Writing Machines, of which the following is a specification.

I have obtained a British patent for the improvements made the subject-matter of this application, which patent is dated December 27, 1894, and numbered 25,153.

My improvements in type-writing machines relate more particularly to a mechanism for holding the paper, &c., upon the platen and for feeding the same, an escapement or step-by-step carriage-feeding mechanism, a carriage-releasing mechanism, a mechanism for stopping the carriage and for locking the printing mechanism at the end of a full line or column-line and for then releasing the same to permit additional characters to be printed, a bell mechanism for giving an alarm before reaching the end of a full line or column-line, a marginal stop and a carriage-stop, a ribbon-feeding mechanism for moving the ribbon automatically lengthwise and widthwise and also for automatically reversing it when it may become unwound from either of the ribbon-spools, and a mechanism for preventing the ribbon from being wound upon either spool in the wrong direction.

My improvements consist in the various features of construction and combinations of devices hereinafter more fully described, and particularly pointed out in the appended claims.

Figure 1:
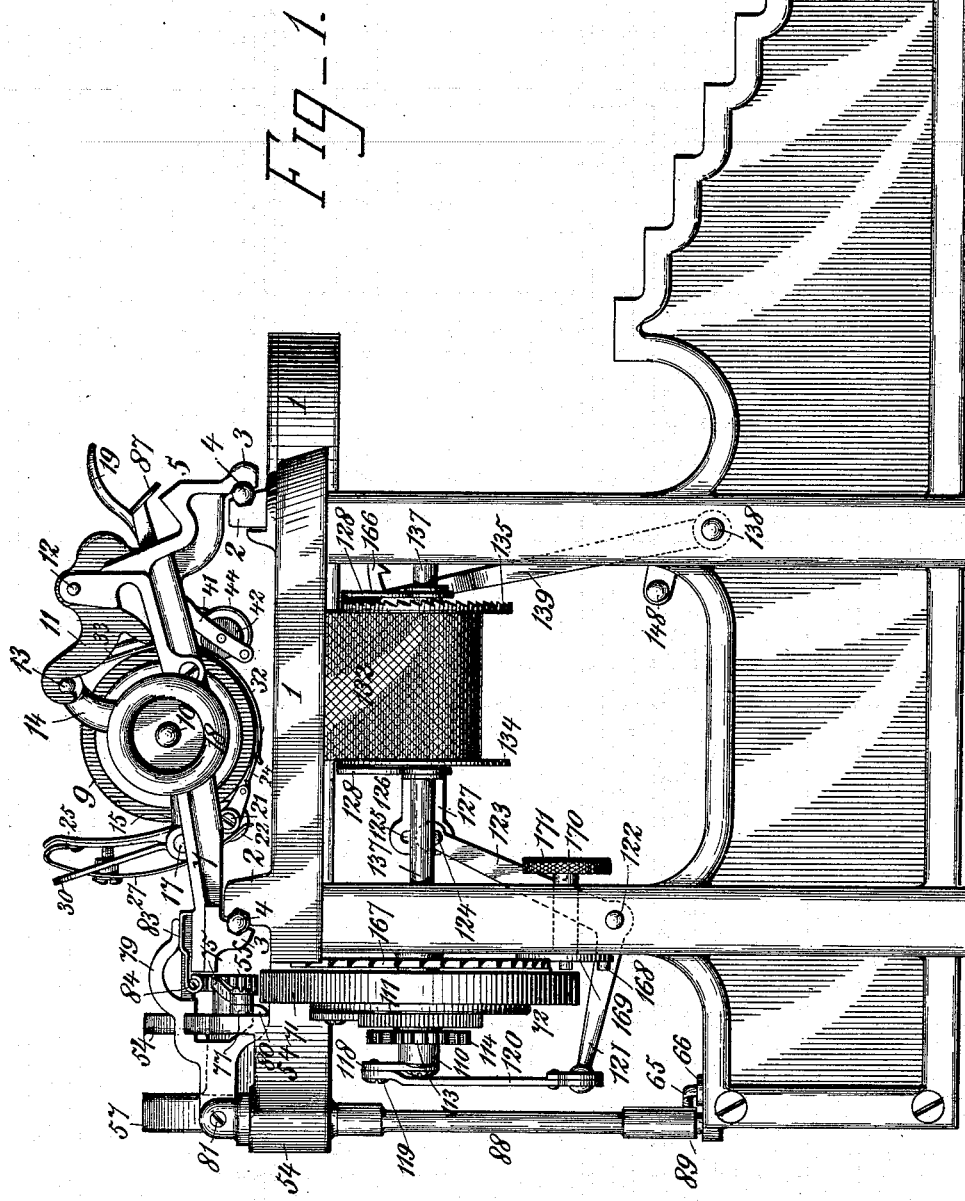
Figure 2:
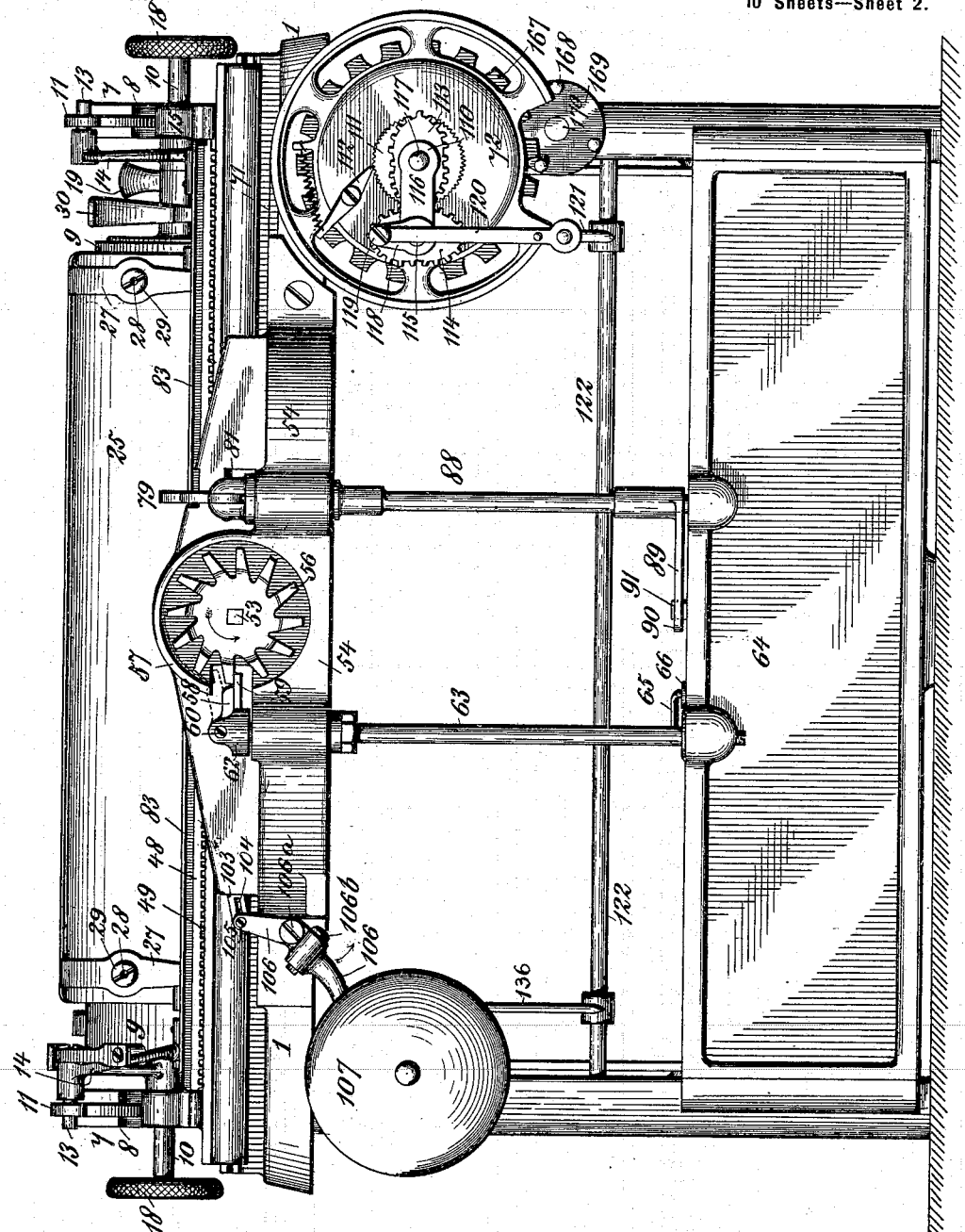
Figure 3:
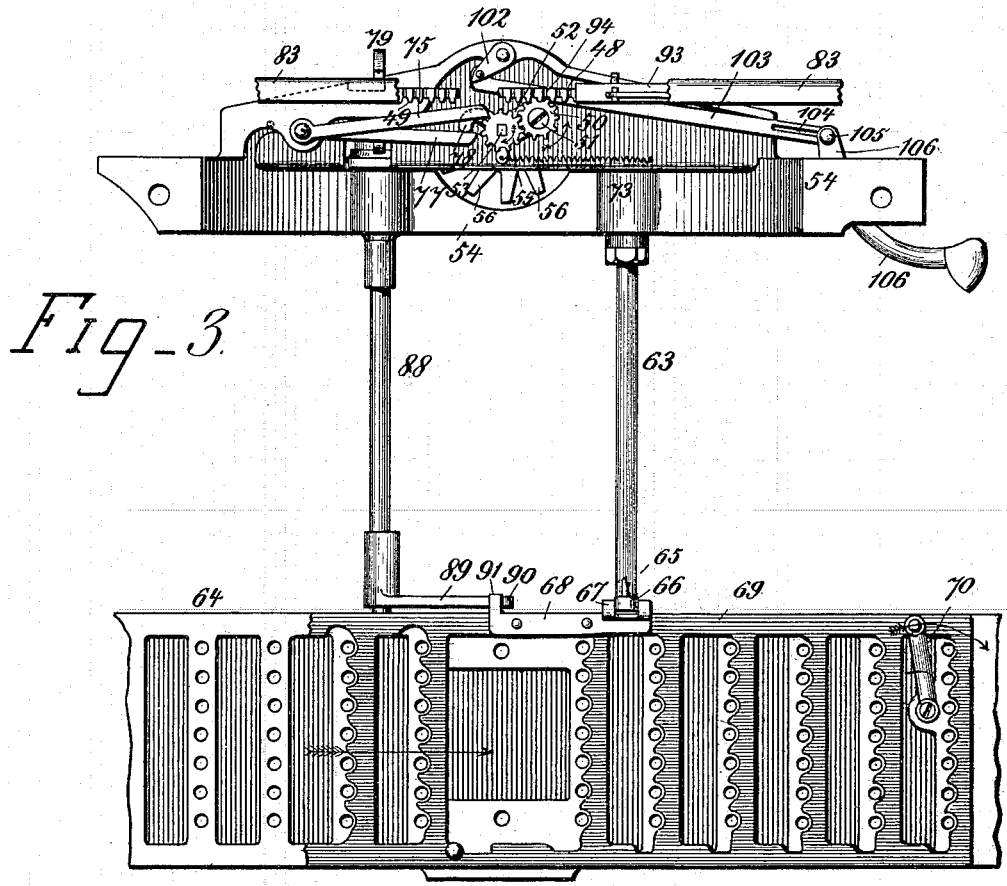
Figure 4:
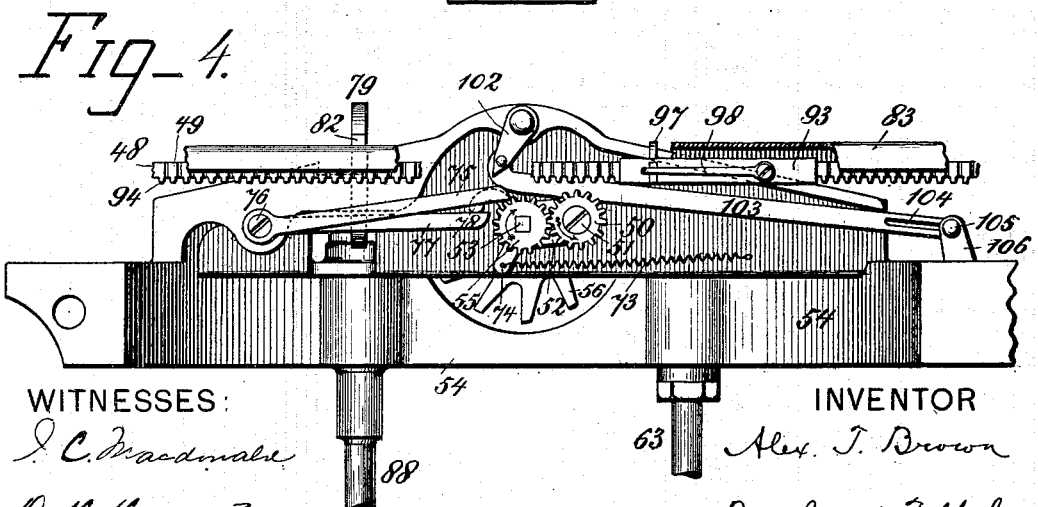
Figure 16:
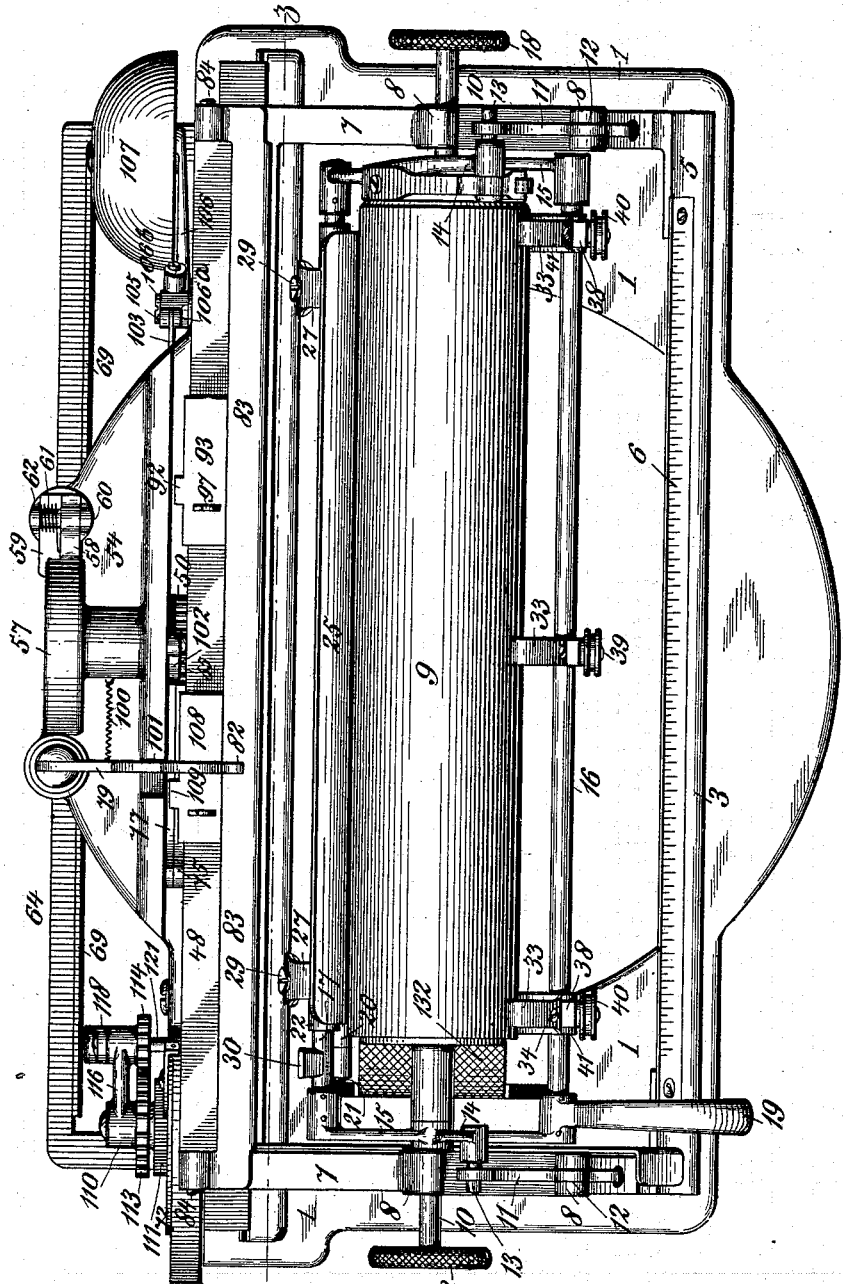

In the accompanying drawings, Figure 1 is an elevation taken at the left-hand side of a type-writing machine embodying my improvements, part of the keyboard of the machine being broken away and the finger-keys being omitted. Fig. 2 is a rear elevation of the same. Fig. 3 is a vertical section, viewed from the front of the machine, of the rear part of the machine, showing more particularly the escapement mechanism, the said section being taken at the line $zz$ of Fig. 16. Fig. 4 is a view similar to Fig. 3, slightly enlarged and omitting the universal bar or sliding gate, the rack-pinion being shown as disengaged from the feed-rack for the purpose of releasing the carriage. Fig. 5 is a sectional plan view of the escapement mechanism, with the releasing mechanism, the margin-stop, and the bell mechanism added. Fig. 6 is an enlarged plan view of the ratchet-wheel and ratchet-dogs forming part of the escapement mechanism. Fig. 7 is an enlarged plan view of the carriage-stop and line-locking mechanism. Fig. 8 is a perspective view of the combined carriage-stop, line-lock actuator, and bell-trip and showing its mode of attachment and adjustment. Fig. 9 is a vertical section thereof, taken at the line $yy$ of Fig. 8. Fig. 10 is an end sectional view taken at the line $xx$ of Fig. 5, showing more particularly the carriage-releasing mechanism. Fig. 11 is a side elevation of the ribbon-feeding mechanism, omitting the framework, the view being taken at the left-hand side of the machine, considered from the front. Fig. 12 is a sectional elevation, slightly enlarged, of the ribbon-feeding mechanism at the right-hand side of the machine. Fig. 13 is a similar view with the parts in different positions and with the ribbon unwound from the spool and with the reversing-hook in operative position relatively to the feeding-pawl. Fig. 14 is a skeleton perspective view of the spool-rotating pawls, with their controlling devices, said view also including a side elevation of the cam and roller. Fig. 15 is a top plan view of one of the ribbon-spools, with its associated devices and illustrating the manner of locking the ribbon-spools, so as to prevent the ribbon from being wound thereupon in a wrong direction. Fig. 16 is a top plan view of the machine exclusive of the keyboard and of the type-bars. Fig. 17 is an end view of the paper-feeding mechanism, showing the front paper-roll out of contact with the platen and the rear paper-roller in contact therewith. Fig. 18 is a similar view showing the front paper-roll in contact with the platen and the rear paper-roller removed from the platen for releasing the paper. Fig. 19 is a rear elevation, partly in section, of the paper-feeding mechanism. Fig. 20 is a front elevation, enlarged, of the front paper finger or guide and its roll. Fig. 21 is a side elevation of the same, showing the method of throwing the roll into and out of contact with the platen. Fig. 22 shows in sectional elevation part of the ribbon mechanism at the right-hand side of the machine and illustrating the action of the ribbon on the reversing mechanism, the locking-finger in this view riding on a portion of the ribbon wound upon the spool. Fig. 23 is a similar view with the ribbon unwound from the spool and the rider of the reversing mechanism in an aperture in the side of the spool to permit the reversing-hook to engage with the operating-pawl of the spool, the said rider being also shown in position to lock the spool against being wound in the wrong direction. Fig. 24 is a sectional elevation of the bell-hammer. Fig. 25 is a horizontal central section showing more particularly the scape or ratchet wheel, the pinions, the shaft, bearing, &c.; and Fig. 26 is a view showing the preferred form of cast-off lever for the feed-roller.

In the various views the same parts will be found designated by the same numerals of reference.

As will be observed, I have embodied my several improvements in that description of type-writing machines known as the "Smith Premier Type-Writer," and for which they were more especially designed; but it will of course be understood that many of my said improvements are applicable to machines of other construction or make, and hence I do not wish to be considered as limiting my invention or improvements to this particular type of machines.

The key mechanism, comprising the finger-pieces and the rock-shafts, which act upon the universal bar or sliding gate (shown at Fig. 3) and also upon the type-bars, being inconvenient of illustration without elimination or reduction in size of some of the other parts of the mechanism and being familiar to those skilled in the art, I have omitted from the drawings. I have, however, shown the Smith Premier paper-carriage and swinging platen in connection with my improved escapement mechanism and paper-feeding devices.

Upon the top plate 1 are two grooved bars 2, and on the paper-carriage are two oppositely-grooved bars 3, the said grooves forming longitudinal bearings for the antifriction-balls 4 in substantially the usual way. The front bar 5 of the paper-carriage contains a scale 6, adapted to a fixed pointer arranged opposite the printing-point. The side bars 7 are inclined upwardly from their rear to their front ends and are provided with hook-like stops 8 to limit the swinging movements of the platen 9. The axle or shaft 10 of the platen is adapted to slide up and down upon the inclined surfaces of the side bars and to contact with said hook-shaped stops, and thereby restrict the forward and backward swinging movements of the platen. The platen is guided and controlled in its swinging movements by spring-pressed arms 11, pivoted at 12 on the carriage and at their inner ends hooking upon pins 13, projecting laterally from upright arms 14, made integral with the end bars 15 of the platen-carrier or cradle, which is composed of said end bars and a front rod 16 and back rod 17. The end bars or pieces 15 are provided with hubs which form bearings for the platen-axle, which at its prolonged ends is provided with hand-wheels 18, by which the platen may be rotated. The platen-carrier is provided with a forwardly-projecting handle 19, by which the platen may be conveniently rocked forward for inspection of the work on its under side and then returned.

Upon the back rod 17, near each end, is pivoted a bracket or hanger 20. Centrally of the length of these brackets or hangers is arranged the shaft or axis 21 of the rear hollow bushed feed-roller 22, which extends substantially the whole length of the platen and rotates freely on its shaft 21. At the lower depending ends of the brackets or hangers is pivoted at 23 a paper-blade 24, which bears against the under side of the platen and which may be graduated or marked to correspond with the scale 6, if desired. A paper-table 25 is by arms 26 connected to the back rod 17. Attached to the upper end of each arm is a sheet-metal spring 27, which is curved upwardly and then downwardly and forwardly, so that its free end may press against the shaft or axis 21 of the feed-roller. The tension of these springs, and hence the pressure of the feed-roller against the platen or the paper thereon, may be regulated by means of the screw-stem 28, projecting rearwardly from the arms 26 and the headed nuts 29 thereupon and upon the springs. The body of the nut passes through a hole in the spring and turns upon the threaded stem, the head of the nut bearing on the outer surface of the spring and being provided with a nick or slit for the accommodation of a suitable tool to effect the rotation of the nut, and hence change the tension or power of the spring. When the nut is screwed inwardly, the tension is increased, and when screwed outwardly it is diminished. By this means the pressure of the feed-roller may be regulated with great nicety.

For the purpose of facilitating the introduction of the paper or its placement or adjustment upon or removal from the platen means are provided to enable the feed-roller to be swung back out of contact with the platen or the paper thereon, the said means consisting of an arm or lever 30, which is secured upon the prolonged end of the feed-roller shaft or axis 21 at the left-hand side of the machine and which extends up to a point where it may be conveniently grasped by the fingers of the operator. The said lever, as shown in the main views, is formed with a semicircular bend 31 to fit around the rear side of the back rod 17, which rod during the manipulation of said lever acts as a fulcrum therefor. Normally the springs maintain the feed-roller in contact with the platen or the paper thereon; but when the said lever is pulled forward at its upper end it pivots about the rod 17 and the feed-roller is caused to move away from the platen, the feed-roller brackets swinging about the rod 17 to permit this action, which is illustrated at Fig. 18. During said withdrawal from the platen of the feed-roller the pivoted paper-blade 24 is slightly retracted, but not sufficiently to fall away from the platen owing to the rearward extension of the front paper fingers or guides 32, to be presently described. When the arm or lever 30 is released, the springs 27 cause all of the parts to return to their normal positions. (Shown at Fig. 17.)

The pressure or feed roller shaft passes freely or loosely through the left-hand hanger and is pinned or otherwise made fast to the right-hand hanger, while the cast-off lever is likewise fast to the shaft at its left-hand end. Owing to the loop in the lever a slight lost motion is created, and in consequence of the above construction at the initial forward pull of the lever the right-hand end of the roller is caused to slightly move away from the platen before the left-hand end of the roller; but when the lost motion has been taken up and the loop bears against the back rod of the carriage both ends of the roller move away from the platen together. When the lever is released, the spring-pressed roller moves bodily at first, but the left-hand end thereof contacts with the platen before the right-hand end, thus insuring an even seating or bearing of the feed-roller on the platen for its full length. The main object of this construction is to obtain a true and even pressure all along the line of the roller and at the same time to enable the roller to be cast off fully at each end by the lever to facilitate adjustments of the paper in any direction while on the platen.

In practice I prefer to use the form and arrangement of cast-off lever shown at Fig. 26, in which the lever is shown as provided with an arm 31ª, adapted to bear against the back rod of the platen-carrier and in which the finger-piece or handle end of the lever extends upward and forward to a more convenient position for manipulation by the operator. In this view it will be observed that the end of the arm stands normally out of contact with the carriage-rod, and hence affords the lost motion above referred to in connection with the loop 31.

The front fingers or guides 32 are preferably three in number and are normally arranged one centrally of the platen and one at each end thereof. These guides and their connected parts are all constructed alike, and a description of one will therefore suffice for all.

Each finger or guide 32 is made of sheet metal and for its major part is bent to correspond with the curvature of the platen. The upper portion of the finger or guide extends slightly above the plane of the top of the platen and is bent to form a straight downwardly and outwardly projecting portion 33 for attachment by a screw 34 to a parallel support or arm 35, formed integral with a block or bracket 36, which has a central transverse opening to enable it to embrace the front rod 16 of the platen-carrier. The rear side of the block is provided with a tongue which enters a groove 37 in said rod, thereby preventing the block and its attachments from turning upon said rod. The upper portion of the block is formed with a head 38, which is perforated for the passage therethrough of a screw-stud 39, secured to the arm 35, whereby the block may be clamped upon said rod and held against endwise movement by a milled nut 40, the stud being provided with a head to prevent accidental detachment of the nut.

Pivotally hung on the front rod 16 are two plates or arms 41, Figs. 17 to 21, which embrace the block 36 and which support and carry a small feed-roll 42, whose journal takes a bearing in said plates or arms and serves to connect them together, in conjunction with a cross-pin 43 at the lower ends of said arms or plates. Attached to said cross-pin is a curved plate-spring 44 of a width substantially equal to the distance between the inner sides of the arms 41 and arranged in front of the roll 42, thereby serving the additional function of a shield for said roll. The upper end of said spring is free or unattached and bears on the under side of the block 36, which is provided with two downward projections 45 and 46 to serve as stops for the said free end of the spring. The said spring by its tension is adapted to hold the roll 42 either in contact with the platen or the paper thereon or away therefrom, the guide 32 having an opening for the roll. At Fig. 21 the free end of the spring rests against the stop 45 in the full lines, and when in this position the spring acts to hold the roll and its holder away from the platen, as shown by the full lines. In the same view the roll is shown in dotted lines as pressing against the platen, which is shown in section, and this result is effected by simply pulling the free end of the spring forward against the front stop 46, the stops 45 and 46 being arranged on opposite sides of the axis of motion of the roll-holder, and hence the latter is caused to move by the spring in one direction or the other, according to the position of the free end of the spring, all as clearly indicated by the full and dotted lines at said figure. The outward movement of the roll and its holder is limited by projections 47 on the upper ends of the arms or plates 41, which strike against the root of the finger 33, which is widened or winged for this purpose. These springpressed rolls are useful more particularly in writing upon envelops and other stiff materials which do not conform readily to the curvature of the platen and for also holding the ordinary paper firmly after the tail end of the sheet has left the rear feed-roller and it is desired to write as near to the bottom edge of the sheet as is possible. The fingers or guides and the paper-rolls may be moved lengthwise on the rod 16 and reset at any desired localities in accordance with the demands of the work by simply relieving the frictional grip of the block, when the contrivance as a whole may be slipped or slid along the rod to the desired new position and reclamped thereat.

At the rear side of the paper-carriage and extending for substantially its whole length is firmly affixed a bar 48, the under rearmost portion of which is formed with a series of equidistant teeth to constitute a feed-rack 49, with which coöperates a pinion 50, mounted to turn on a stud 51, projecting rearwardly from an arm or crank 52, mounted to oscillate upon a horizontal shaft 53, adapted to rotate in suitable bearings in a large segmental general bracket 54, which is attached to the top plate at the rear of the machine. Upon the inner end of said shaft is made fast another pinion 55, of the same size as the pinion 50 and arranged to gear therewith. On the opposite rear end of said shaft is secured a larger ratchet-wheel 56, which preferably rotates in a casing 57, cast with said general bracket. In connection with said ratchet-wheel are employed two dogs 58 and 59, the latter being the holding-dog and the former the feeding-dog. The feeding-dog is mounted upon a horizontal pivot 60, and said dog is provided with a spring 61, which is coiled upon a hub projecting from the rear side of the dog and mounted on said pivot and attached at one end to the feeding-dog, so as to swing its point upwardly. The pivot-pin passes through ears in a head 62, which is fast upon the upper end of a vertical oscillatory spindle 63, Figs. 2 and 3, having a bearing at its upper end in the said general bracket and a bearing at its lower end in the back plate 64 at the lower part of the machine. The holding-dog is secured to the top of the head 62 by a screw. (Not shown.) Near the lower end of said spindle is affixed a crank-arm 65, which bears a small stud or roller 66, that is embraced by two ears 67 on a bracket 68, attached to the vertically-arranged universal bar or sliding gate 69, common to the Smith Premier type-writer, and hence requiring no detailed description of its construction or mode of operation. It will suffice to say that the said universal bar or gate slides or swings from left to right, preferably by means of the link 70, as the finger-keys are depressed and in the reverse direction when the finger-keys are released. When the universal bar slides toward the right, the spindle 63 is oscillated through the lugs 67 and crank-arm 65, and the dogs are both thereby vibrated in a horizontal plane toward the front of the machine, as indicated by the dotted lines at Fig. 6. When this takes place, the feeding-dog 58, which normally arrests the rotation of the ratchet-wheel 56, is moved out of the path of the teeth of the ratchet-wheel and the holding-dog is moved into engagement therewith to prevent any rotation of the ratchet-wheel and movement of its connected parts at this time. As soon, however, as the finger-key is released the spring-actuated universal bar returns to its normal position, and through the intermediate devices described the holding-dog is moved out of engagement with the ratchet-wheel and the feeding-dog into engagement therewith, and during this movement the ratchet-wheel turns a distance equal to the space between two successive teeth. This is owing to the fact that when the feeding-dog was moved out of engagement with the ratchet-wheel its spring 61 acted to vibrate said dog and throw its operative end up above the plane of the tooth of the ratchet-wheel which it had just obstructed. Hence when said feeding-dog was oscillated back into engagement with the ratchet-wheel it took a position in front of the next succeeding tooth on the ratchet-wheel, and the holding-dog being out of the ratchet-wheel at this time the latter could turn until the feeding-dog was vibrated or carried down against its stop. The ratchet-wheel is caused to revolve in this manner step by step every time a finger-key or space-key is actuated and released by reason of the ratchet-wheel being connected, through the two pinions 55 and 50, to the feed-rack of the paper-carriage, which latter is connected in the usual manner by a strap, cord, or chain 71 to a spring driving drum or wheel 72. From this construction it will also be observed that the paper-carriage is fed only one letter-space distance at each step of rotation of said ratchet-wheel, the said ratchet-wheel and its dogs, together with said pinions and the rack, forming an escapement mechanism for the power-driven paper-carriage in its forward movements or in traveling from right to left.

At Fig. 2 the vertical vibration of the feeding-dog is indicated by the dotted lines, and it will be seen at said view that the casing 57 is cut away to permit this action.

The pinion 50 is held normally in engagement with the rack by means of a spring 73, Figs. 3 and 4, which at one end is attached to the general bracket and at the other end to an arm 74, projecting downwardly from the crank-arm 52. By reason of this construction the carriage may be moved backward or from left to right for the beginning of a new line, the vibrating pinion-teeth simply bobbing in and out of the notches of the feed-rack as long as the backward movement of the carriage is continued; but the instant this movement ceases the pinion reëngages the feed-rack, and thus prevents the carriage from moving forward under the influence of the spring-drum, the said pinion being prevented from rotating by reason of its teeth intermeshing with the teeth of the pinion 55, which at this time is held stationary by the ratchet-wheel and its associated dog 58. During the return movement of the carriage and while the pinion 50 is bobbing or trailing over the teeth of the feed-rack the pinion 55 is prevented from turning backwardly, and hence also moving the ratchet-wheel in the same direction by means of a dog 75, which is pivoted at 76 in the general bracket.

In order to permit the carriage to move quickly independently of the actuating or printing keys in either direction, I have provided a release-key mechanism constructed and operating as follows: On the pivot 76 is also mounted an arm 77, whose inner free end underlies an arm or projection 78, integral with the crank 52 and arranged on the opposite side of the pivot thereof. When this arm 77 is elevated, the crank-arm 52 and its pinion 50 are caused to descend through the lifting of the arm or projection 78, and hence the escapement mechanism is separated or the feed-rack released from the pinion, thus leaving the carriage free to be moved rapidly in either direction by the spring-power toward the left or by the hand toward the right. When said lever 77 is permitted to descend, the spring 73 acts to return the pinion 50 into engagement with the feed-rack. The crank 52 and the lifting-arm 78 may be said to constitute a lever of the first order, having its fulcrum or pivot on the shaft 53. The arm 77 is lifted by a lever 79, having a hook 80, upon which said arm rests, the lever being pivoted at 81, Figs. 1 and 2, and vibrating vertically at right angles to the vertical vibration of the arm 77. The free end 82 of said lever 79 rests upon a plate or bar 83, which extends the full length of the paper-carriage and is horizontally pivoted at 84 thereto, so that it may rock or swing in a vertical plane. Underneath said rocker-bar at its left-hand end extends the free rearmost end of a lever 85, Figs. 5 and 10, which is pivoted at 86 to the side bar of the carriage and which is provided at its outermost end with a finger-piece 87, said lever constituting a release-key.

When the finger-piece of the release-key is pressed downward, as shown by the dotted lines at Fig. 10, the rocker-bar 83 is thrown upward and in turn causes the lever 79 to swing upward about its pivot and through the hook 80 to effect a vibration of the arm 77 about its pivot, which movement of said arm, as above explained, operates through the arms 78 and 52 to throw the pinion 50 down out of engagement with the feed-rack, and as long as the finger-piece is thus held pressed down the carriage may be moved freely along its ways independently of the escapement mechanism. Upon releasement of the finger-piece the parts will return to their first positions by gravity and with the aid of the returning-spring 73. Inasmuch as the lever 79 is connected to the framework of the machine and always occupies a relatively fixed position it is therefore essential that the rocker-bar 83 shall extend the full length of the carriage in order that said lever may be raised in any position of the carriage. The lever 79 forms also a part of the carriage stop mechanism and the mechanism for locking the line or preventing the types from printing when the end of a line or column is reached, as will presently appear. The said lever 79, in addition to its vibration in a vertical plane, due to its horizontal pivot, is capable also of a horizontal vibration in consequence of being mounted upon a vertical oscillatory stem or shaft 88, having a bearing at its upper end in the general bracket and at its lower end in the lower back plate 64 of the machine. An arm 89, having a hook 90 at its free end, is secured to the lower end of said shaft 88. This hook is adapted to engage a hook or projection 91 on the bracket 68, attached to the universal bar, when said shaft is oscillated and by such engagement to effect the locking of said universal bar and of the escapement mechanism and of the type movement or printing mechanism, to which it is connected. The said hook 90 stands normally out of the path of movement of the projection 91; but when said stem is oscillated the hook is moved over into the path of said projection and operates to lock it, with the result that so long as these two devices are in engagement it is impossible to either feed the paper-carriage or to effect an impression upon the paper by the types.

The shaft 88 is caused to oscillate by the horizontal swinging movement of the lever 79, which is effected by a projection 92 on the paper-carriage. This projection is made integral with an adjustable block or slide 93, which is fitted upon and supported by the bar 48, which constitutes also the feed-rack. The block or slide is preferably dovetailed upon the said bar, as shown at Fig. 8, and the said bar is provided on its front edge with a series of inclined or beveled teeth 94, corresponding in distance apart to the feed-rack and also to the divisions of the machine-scale. With any of the spaces between these teeth a dog 95 is adapted to engage to effect the holding of said slide in any desired position upon said bar. The said dog is made integral with a sliding shank 96, having a finger-piece 97, whereby the dog may be conveniently engaged with or disengaged from the series of teeth 94, the slide being slotted transversely, as shown, to permit of the transverse movements of the finger-piece, which after disengaging the dog or catch may be conveniently employed to move the slide along upon the bar. The dog is at one end of the shank, and the finger-piece, at near the other end thereof, projects in a direction opposite that of the dog, and the shank slides in the housing or guide formed between the top of the bar 48 and the under side of the upper member of the slide. A flat spring 98 is attached at one end to the front side of the slide and bearing at its free end against the protruding end of the dog operates to force the dog into engagement with the teeth when the finger-piece is released and to normally maintain such engagement.

During the foward movement of the carriage the front side of the projection 92 strikes against the arm or portion 99 (see Fig. 10) of the lever 79 and causes it to vibrate, as shown at Fig. 7, thereby effecting simultaneously the stoppage of the carriage and the locking of the line. On the return of the carriage the lever 79, its shaft, and the hooked arm thereon are caused to return to their normal positions by means of a coiled spring 100. (Shown more particularly at Fig. 16.) The backward movement of the arm under the influence of this spring is limited by an abutment 101, formed by cutting a notch in the upper edge of the vertical portion of the general bracket.

It will be observed from the above construction that after the carriage has been stopped and the line locked a further movement of the carriage and additional printing may be effected (provided the carriage has not traveled to its full extent) by lifting the lever 79, thus releasing the universal bar, the feeding mechanism, and the printing mechanism.

The lever 79 is lifted by the release-key through the bar 83, and as soon as it is raised above the contact or projection the spring 100 swings it toward the right and on top of said contact or projection, thus enabling the writing to be resumed; but this operation does not disengage the pinion 50 from the feed-rack owing to the fact that lost motion is provided between the arm 77 and the hook 80, as shown at Fig. 10, the lever 79 being released when returning to its stop before the arm 77 can be lifted. This operation involves only a partial depression or movement of the release-key. If the latter be wholly depressed or its depression be continued after the return of the stop-lever 79, the swinging pinion 50 will be disengaged from the feed-rack. Hence to release the carriage the release-key is wholly depressed, while to release the stop-arm it is only partially depressed. By these devices it will be seen that it is also possible to write several columns widthwise upon a sheet and arrest the carriage and lock the line at the end of each column.

The projection 92, besides serving as a carriage-stop and line-locking device, performs the function also of a bell-trip, as will now be explained. Directly over the escapement-wheel shaft 53 is pivoted a bell-operating lever 102, to the lower end of which is pivotally connected a rod 103, which at its outer end is slotted at 104 and connected to a pin 105 on the upper end of a bell-hammer 106, which is pivoted to the general bracket at 106ª. As the carriage advances the lower end of the operating-lever 102 comes into contact with the projection 92, is vibrated thereby to raise the bell-hammer, and after riding over the top of said projection the said operating-lever drops therefrom and allows the hammer to strike the bell or gong 107. In the return movement of the carriage the operating-lever 102 is permitted to ride back over the top of said projection 92 and without vibrating the bell-hammer or giving an alarm by reason of the slotted connection which said lever has with said bell-hammer.

As will be seen at Fig. 24, the bell-hammer is provided with a spring-pressed headed pin 106ᵇ, which slides in an opening or housing formed transversely in said bell-hammer. The object of this construction is to cause the striking end of the bell-hammer to rebound immediately after falling upon the bell in order to obtain a clear ringing sound instead of a dull thud, which would be the case if the hammer were permitted to rest upon the bell. The said rebound of the hammer is caused by the striking of the head of the pin against the general bracket 54, as indicated by the arrow at Fig. 24.

A contrivance similar in construction to that shown at Fig. 8 is employed for a margin-stop, &c. This will be found illustrated at Fig. 16 and marked as an entirety with the numeral 108. The projection 109 thereof is adapted, on the return movement of the carriage, to contact with the lever 79 and thereby stop the carriage, the abutment 101 serving to take the shock or thrust and at the same time arrest the carriage. By adjusting this device along the bar 48 in the manner above explained with reference to the slide 93 the margin at the left-hand side of the sheet may be as wide or as narrow as desired. When, however, it may be desired to write within this margin, the lever 79 is raised (preferably by means of the release-key 85) in order that the projection 109 may be carried to the right of said lever, thus enabling the writing to be done within the margin, the stop 109 feeding down toward the lever until it strikes on the right-hand side thereof, when by a continued movement the lever is swung to the left and operates to lock the machine before the types can print into the body of the sheet. The said projection on the marginal stop when thus employed also trips the bell, so that in writing an annotation in the margin an alarm may be sounded and the carriage and printing mechanisms locked in the same manner as at the end of a line of writing extending across the entire sheet.

The marginal stop contrivance 108 is provided with a spring-actuated dog or catch and a finger-piece of precisely the same construction as the contrivance 93, and the views at Figs. 8 and 9 may represent both contrivances.

The stop contrivances 93 and 108, it will be observed, are each adapted to stop the carriage in either direction of its travel and also to operate the bell or alarm prior to stopping the carriage at the right-hand end of a full line or a column-line. While I have shown but two of these stop contrivances, as many may be employed as desired.

The ribbon-feeding mechanism comprises means for feeding the ribbon step by step longitudinally, means for feeding it step by step widthwise, and means for automatically reversing its longitudinal direction of motion. Upon the hub of the spring-drum 72 is mounted a ratchet-wheel 111, with which engages a spring-actuated pawl 112, pivoted at the side of the drum. This ratchet-wheel is provided on its side with a bilobed or double cam-gear 113, which engages with and drives a similar gear 114, mounted on an axis 115 at the inner end of a bracket 116, firmly secured to the shaft 117 of the drum, which shaft is fixed in the framework. To the outer end of the axis 115 is attached a crank 118, the wrist-pin 119 of which is pivotally connected to the upper end of a link 120, whose lower end is connected to the outer end of a rocker-arm 121, secured to a rock-shaft 122, extending entirely across the machine and having suitable bearings in the side frames thereof. From said rock-shaft extends upwardly another rocker-arm 123, which is preferably made integral with the arm 121 and forms therewith a bent lever at the left-hand side of the machine. The free end of the arm 123 is loosely connected by a pin 124 and a slot 125 to the ribbon-spool-carrying frame, (designated as an entirety by the numeral 126,) the said slot being formed in a rearwardly-projecting arm 127, forming part of said carrying-frame, which comprises also outwardly and downwardly extending arms 128 at right angles to said arm 127 and embracing the ribbon-spool 129, the free ends of said arms 128 being connected to the outer flanged ends of a central core or sleeve 130 of the ribbon-spool. The arms 128 are parallel and are formed integral with a vertical plate 131, which at its upper end forms a support for the inking-ribbon 132, lateral guides for which are afforded by outwardly-bent flanges 133.

The ribbon-spool 129 has a circular flange 134 at its rear end and a crown ratchet-wheel 135 at its front end.

It may here be stated that the ribbon-spool and its frame or carrier on the right-hand side of the machine are constructed like the same devices at the left-hand side of the machine above described; and it may also be stated that at the right-hand side of the machine there is a rocker-arm 136 similar in construction and operation to the rocker-arm 123; but the rocker-arm 136 is not provided with a rocker-arm as 121, since the power is applied at the left-hand side of the machine and the motion is transmitted to said rocker-arm through the rock-shaft 122.

It will be seen from the foregoing that the ribbon-spools are connected together through their frames and the rocker-arms 123 and 136 and the rock-shaft 122, and that hence the said spools and the ribbon may be moved backward and forward in unison as said rocker-arms are vibrated, the ribbon-spools being mounted to slide longitudinally upon fixed axes or supports 137. The ribbon is moved transversely step by step as each character is imprinted, and thus the ribbon is utilized in the direction of its width during the forward movements of the paper-carriage. The rocker-arms and rock-shaft are actuated by the arm 121, the link 120, the crank 118, and the bilobed gears 114 and 113, the latter acting to drive the former and this in turn serving to rotate the crank and through its link or rod to convert the rotatory motion of these parts into a vibratory movement of the rocker-arms and through them into a reciprocatory sliding motion of the ribbon-spools and the ribbon.

The object of the employment of the two bilobed or quasi-elliptical gears is to give to the ribbon an approximately uniform transverse or crosswise feed, which, it will be understood, is very desirable in order that the ribbon may not be struck several times in the same spot by the types, which is the case where a crank or eccentric is employed with ordinary gearing. By the shown and described arrangement of the gears it will be observed that the movement of the spools will be substantially equal at all points of their travel, and hence the ribbon is afforded practically a uniform step-by-step feed at all times, thus avoiding the delay in the feed of the ribbon at the limits of the throw of the crank (or at the time of the reversal of the direction of movement of the ribbon) common to all prior machines employing cranks or eccentrics and found to be highly objectionable in practice.

The bilobed gears resemble somewhat elliptical gears, but are not constructed in the manner of elliptical gears for economical reasons. The lobes being bounded by arcs of circles the teeth can all be cut with a single cutter designed for producing circular gears. Nevertheless true elliptical gears may be employed in lieu of the quasi-elliptical gears shown. Therefore by the term "bilobed gears" I desire to be understood as not limiting myself to gears of the exact conformation shown and as including any pair of gears in which each has a major and a minor axis, and the two gears operate in substantially the manner set forth.

I shall now describe the means for moving the ribbon longitudinally or from one spool onto the other: On a suitable pivot 138 on the framework of the machine at the left-hand side is mounted an arm 139, having at its upper end a driving-finger 140, preferably triangular in cross-section, which is adapted to engage with the crown ratchet-wheel 135 on the left-hand spool to rotate the same and to wind the ribbon thereupon. On the right-hand side of the machine and mounted on a suitable pivot 141 of the framework is a similar arm 142, provided with a similar driving-finger 143, adapted to engage with the crown ratchet-wheel on the right-hand spool for the purpose of rotating it and winding the ribbon upon said spool. The arm 142 has, however, a projection 144 extending below its pivot, which projection is acted upon in front by an arm 145, fast on a rock-shaft 146, extending across the machine and mounted in suitable bearings in the framework. At near the left-hand end of said rock-shaft is affixed another rocking arm 147, which extends up past the pivot 138 and contacts with the rear side of the arm 139. The arms 139 and 142 and their fingers may be considered as "driving-pawls," and in order to avoid confusion I shall hereinafter designate them as such.

The construction thus far described is such that only one driving-pawl at a time can be in engagement with its ratchet-wheel and also such that the gravity of said pawls tends to put them into engagement with their respective ratchet-wheels when unrestrained. The pawl 139 is controlled by the arm 147 and the pawl 142 by an arm 145. The arm 147 bears a finger-piece 148, by which it may be conveniently actuated. When the arm 147 is in the position indicated by the full lines at Fig. 14, the pawl 142 is in operative relation to its ratchet-wheel by reason of the forward position of the arm 145, and the pawl 139 is held out of operative relation to its ratchet-wheel by reason of its contact with the upper portion of the arm 147, which at this time is also in its forward position. When, however, the arm 147 is pushed rearwardly to the dotted-line position shown, the pawl 139 is permitted to fall into engagement with its ratchet-wheel and the pawl 142 is drawn out of engagement with its ratchet-wheel by the backward movement of the arm 145.

For the purpose of holding the rocker-arms 145 and 147, and hence the pawls 139 and 142, in their forward or backward positions against accidental displacement the arm 147 is provided with a spring-arm 149, arranged at right angles to the arm 147 and projecting rearwardly. The free innermost end of the arm 149 is bent at right angles to its body and is V-shaped to form a cam-like device 150, which coacts with a small roller 151, journaled in the side frame of the machine. When the arm 147 is vibrated rearwardly, the cam 150 is moved down past the axis of the roller 151 and its upper surface bears against the under side of said roller. When the arm 147 is moved in the reverse direction, the under side of the cam is moved up past the axis of said roller and bears upon the upper side of the latter. In moving thus up and down the cam must be forced inwardly slightly, and this is permitted by reason of the lateral flexibility of the arm 149, which, being a spring-plate or elastic arm, causes the cam to fly outwardly when the axis of the roller is passed in either the upward or downward movement of the cam. Hence by these means a simple and effective locking contrivance is provided for the spool-rotating mechanism and one which acts automatically during the reversal of the spool-rotating pawls.

The arm 147 is intended to be vibrated by its handpiece 148 only when it may be desired to reverse the longitudinal direction of the ribbon before it has reached its end, or, in other words, before it has been entirely unwound from either spool.

The machine is provided with mechanism for automatically throwing into and out of operation the spool-rotating pawls in order that the ribbon may be reversed automatically when either end is reached, and this mechanism I shall now describe. To the arm 127 is pivoted at 152 an arm 153, which is bent laterally near its pivot (in order to avoid the ribbon-carrier and the flange of the ribbon-spool) and then extends forwardly to support at its free end a hook 154, which is pivoted to said arm at 155. The said hook has a rearwardly-extending arm 156 of slightly-greater weight than the hook, which arm has a projection 157, that rests normally upon the lateral bend of the pivoted member 153, thus limiting the descent of the arm 156. At the lower rear end of said arm 156 is a hooked projection 158, which is adapted to strike against the under side of the lateral bend and prevent any disarrangement of the hook. This hook 154 is adapted to engage at a certain time with the spool-rotating pawl 142 and throw it into engagement with its ratchet-wheel, as will be presently more fully described. At the end of the pivoted arm 153 is a finger 159, preferably formed integral with said arm, and after extending upward therefrom for a short distance is bent laterally toward the axis of the ribbon-spool and then upwardly at right angles again to form a stop 160 to prevent the ribbon-spool from rotating in the wrong direction at the beginning of its winding operation. The finger 159 is notched at 161 to embrace the edge 162 of the vertical plate 131, which is cut away, as indicated at 163, to permit of the vibration of the arm 153 and its attachments, the edge 162 being cut on an arc of a circle from the pivot 152 as a center and serving as a lateral guide for the finger and its connected parts. The said finger 159 governs the vibration of the reversing hook pawl-actuator 154 and its supporting-arm, and the movements of said finger are controlled by the inking-ribbon, as will now be explained.

Referring more particularly to Fig. 22, it will be observed that the finger rests upon the inking-ribbon wound upon the spool and that the spool is rotating and the ribbon unwinding in the directions indicated by the arrows. As the coils or folds of the ribbon are reduced in number the finger gradually approaches the center of the spool, which action at the same time permits the arm 153 and the hook 154 to gradually descend. When the said portion of the ribbon is unwound from the spool, as shown at Fig. 23, the support afforded thereby for the finger 159 is removed and the finger drops at once into a peripheral slot 164 in the spool, the hook and its arm dropping correspondingly. This descent of these parts is limited by a hook 165, Fig. 12, at the lower end of the plate 131 and at the termination of the edge 162, the finger dropping upon said hook. When this action takes place, the point of the hook 154 is brought into the proper horizontal plane to engage the driving-pawl 142, as indicated by the dotted lines at Fig. 13, and when said hook is in its foremost position it seizes said pawl, and during the next backward movement of the ribbon-spool carrier the hook will vibrate said pawl rearwardly and cause it to engage with its ratchet-wheel, and by reason of the connections hereinbefore described the driving-pawl 139 will be simultaneously thrown out of engagement with its ratchet-wheel and thereafter the right-hand spool will become the winding-spool. In order to prevent said spool from being turned by hand in the wrong direction, the stop 160 is provided, which bears against the upper end of the slot in the spool and positively checks any further rotation of said spool and insures that the rewinding shall take place in the proper direction. As the spool is rotated by the pawl 142 the lowermost end of the slot 164 operates immediately to lift the finger 159 out of engagement with the spool, and after the spool has made one revolution and the first layer of the ribbon covers said slot the finger will thereafter continue to ride upon the successive layers of said ribbon and to thereby be gradually elevated and operate in turn to raise the hook 154 correspondingly, as indicated at Fig. 12, which figure also shows that by means of the driving-pawl 142 the spool is rotated and the ribbon is moved longitudinally and wound onto said spool during the forward movement of the spool and its carrier, and also that on the backward movement of the latter the driving-pawl maintains its engagement with the ratchet-wheel by gravity, but descends to a lower tooth on said ratchet-wheel in order to obtain a fresh hold thereupon to effect another partial rotation of the spool during the next forward movement thereof. The rider or finger and the opening in the spool, which permits the finger to drop suddenly to operate the switch mechanism promptly, are features which may be employed in machines having a ribbon which travels only longitudinally back and forth.

Inasmuch as the devices composing the reversing mechanism are alike for each ribbon-spool, it will be understood that when the right-hand spool is being driven to wind up the ribbon and the controlling-finger thereon is ascending the left-hand spool is disengaged from its driving-pawl and is unwinding, and consequently that the controlling-finger at that spool is gradually descending as the layers grow less, and with it the pivoted arm and pawl-operating hook, which it controls. As soon as the left-hand spool becomes empty its finger or rider drops into its slot, similar to 164, and the hook 166 grasps the driving-pawl 139, and on the next rearward widthwise movement of the ribbon this pawl is carried back and into engagement with its ratchet-wheel and the other pawl 142 simultaneously rocked out of engagement with its ratchet-wheel. At the same time the stop similar to 160 on the left-hand finger arrests the further rotation of the left-hand spool and insures the rewinding of the ribbon upon said spool in the proper direction. As the winding proceeds the left-hand finger is first forced up out of the slot of the spool and then rides upon the ribbon in the manner hereinbefore explained with reference to the right-hand spool, and during this time the left-hand driving-pawl 139 operates to periodically drive its ribbon-spool step by step during the forward movements of the spool and the ribbon. Thus the ribbon is automatically continuously reciprocated in the direction of its width and also in the direction of its length until totally exhausted, and the mechanisms are such that the surface of the ribbon is completely and uniformly utilized or worn regardless of the length of the ribbon.

It is apparent that in attaching new ribbons to the spools it is impossible to turn either spool backward, and hence wind the ribbon in the wrong direction, on account of the presence of the stops 160, which permit the spools to wind only in one direction always.

It will be understood that the ratchet-wheel 111, which actuates the mechanism that moves the ribbon crosswise, is positively driven by the pawl 112 on the spring-drum during the rotation of the latter in the movement of the paper-carriage from right to left, but that said ribbon-moving mechanism is not affected during the return movement of the drum and the paper-carriage, the pawl at this time simply bobbing idly over the teeth of the ratchet-wheel. Hence the crosswise movements of the ribbon are not dependent upon the length of travel of the paper-carriage; but, on the contrary, the ribbon-moving mechanism is such that the ribbon is moved its full distance crosswise in either direction before returning. The gears 113 and 114 are adapted to move the ribbon from front to rear and back to the front again in making one complete revolution.

It will be understood, of course, that in lieu of the crank 118 its well-known equivalent—an eccentric—may be employed and that other connecting devices between said gears and the ribbon-spool may be employed instead of those shown.

The tension of the spring in the driving-drum may be regulated by a toothed wheel 167, with which engage four pins 168 on a disk 169, mounted on a shaft 170, provided with a hand-wheel 171, by turning which the power of the spring that is connected at one end to the toothed wheel may be conveniently increased or diminished at will.

Various changes in detail construction and arrangement may be made without departing from the gist of my several improvements, some of which may of course be employed without the others.

What I claim as new, and desire to secure by Letters Patent, is—

1. In a type-writing machine, the combination of the platen-carrier, the platen, the pivoted hangers, the hollow spring-pressed feed-roller, the feed-roller shaft rigidly attached to one of said hangers and loosely connected at the other, and a lever fast at the loose end of said shaft, substantially as set forth.

2. In a type-writing machine, the combination of the platen-carrier, the platen, the pivoted hangers, the hollow spring-pressed feed-roller, the feed-roller shaft rigidly attached to one of said hangers and loosely connected at the other, and a lever fast at the loose end of said shaft and having a slight lost motion before bearing upon its fulcrum, substantially as set forth.

3. In a type-writing machine, the combination of the platen-carrier, the platen, the pivoted hangers, the hollow spring-pressed feed-roller, the feed-roller shaft rigidly attached to one of said hangers and loosely connected at the other, and a lever fast at the loose end of said shaft and having an arm extending rearwardly beneath the back rod of the platen-carrier and a handle end extending upwardly and forwardly, substantially as set forth.

4. In a type-writing machine, the combination of a platen-carrier, a platen, a pair of brackets pivoted on the back rod of the platen-carrier, a feed-roller mounted in said brackets, a paper-blade pivoted to the lower, inner ends of said brackets and means for holding the blade up and against the under side of the platen substantially as set forth.

5. In a type-writing machine, the combination of a platen-carrier, a platen, a pair of pivoted brackets provided at their lower ends with a spring-pressed feed-roller, a lever attached at the axis of said feed-roller, and an independent fulcrum for said lever, substantially as set forth.

6. In a type-writing machine, the combination of a platen-carrier, a platen, a spring-pressed feed-roller supported by brackets pivotally hung upon the back rod of the platen-carrier, and a lever connected to said feed-roller and adapted to fulcrum upon the said back rod to cast off said feed-roller, substantially as set forth.

7. In a type-writing machine, the combination of a platen-carrier, a platen, a pair of brackets pivoted upon the back rod of the platen-carrier and supporting a spring-pressed feed-roller, and a cast-off lever connected at its lower end to the axis of the feed-roller and bearing between its ends upon the back rod of the platen-carrier substantially as set forth.

8. In a type-writing machine, the combination of a platen-carrier, a platen, a block having a transverse opening and adjustable longitudinally on the front platen-carrier rod, an upwardly-projecting support, an upwardly-projecting head, both formed integral with said block but separated from each other, a screw and nut for drawing these parts together and holding said block firmly upon said rod, a paper guide or finger attached at one end to the support and bent or shaped to conform substantially to the curvature of the platen, and a depending roll-holder embracing said block and pivoted to move to and from the platen, the paper-guide and the roller both coöperating in the feed, and both arranged for simultaneous lateral adjustment by one operation and without disturbing their relationship to each other; substantially as set forth.

9. In a type-writing machine, the combination of a platen-carrier, a platen, a block having a transverse opening and provided with a tongue to engage a groove in the front rod of the platen-carrier, and having also an upwardly-projecting support and an upwardly-projecting head, a screw and nut, a curved paper-guide, and a depending roll-holder embracing said block and pivoted to move to and from the platen, the paper guide or finger and the roller both coöperating in the feed, and both arranged for simultaneous lateral adjustment by one operation and without disturbing their relationship to each other; substantially as set forth.

10. In a type-writing machine, the combination of a platen-carrier, a platen, a paper-roll, a pivoted holder for said roll, and a plate-spring attached at one end to said holder and free at its opposite end, whereby said spring is adapted to hold the roll against or away from the platen substantially as set forth.

11. In a type-writing machine, the combination of a platen-carrier, a paper-roll, a pivoted holder therefor, a plate-spring attached at its lower end to said holder and extending up above said roll, and stops for the free end of the spring arranged on opposite sides of the axis of motion of the roll-holder, substantially as set forth.

12. In a type-writing machine, the combination of a platen-carrier, a platen, a block mounted upon the front rod of the platen-carrier and provided with two projections on its under side, a paper-roll, a roll-holder mounted upon said platen-carrier rod, and a spring attached at its lower end to said holder and bent so as to have its free end bear on the under side of said block and play between said stops substantially as set forth.

13. In a type-writing machine, the combination of a platen-carrier, a platen, a block adjustable upon the front rod of the platen-carrier and provided on its under side with two projections, a paper-roll journaled in side plates pivoted upon said rod and having projections at their upper ends, a bent spring attached at one end to said plates and free at its other end to move between the said stops on said blocks substantially as set forth.

14. In a type-writing machine, the combination of a power-driven paper-carriage provided with a feed-rack, a pinion normally in engagement with said feed-rack and adapted to be rotated thereby during the feed of the carriage and adapted and arranged to bob in and out of the teeth of the feed-rack during retraction of the carriage, a second pinion geared to said first-mentioned pinion so as to be driven thereby, a ratchet-wheel connected to the second pinion in a manner to be rotated by it, and dogs for controlling the rotation of said ratchet-wheel, and through the pinions the movements of the carriage, substantially as set forth.

15. In a type-writing machine, the combination with a carriage having a relatively-fixed feed-rack, of a pinion adapted to be rotated thereby and to communicate rotative movement to a dog-controlled escapement-wheel, the said pinion being loosely mounted and adapted to trail and bob in and out of the teeth of the feed-rack during retraction of the carriage; substantially as set forth.

16. In a type-writing machine, the combination of a power-driven paper-carriage having a feed-rack, a vibratory pinion normally in engagement therewith, a second pinion, and a dog-controlled escapement-wheel connected to said second pinion, substantially as set forth.

17. In a type-writing machine, the combination of a power-driven paper-carriage having a feed-rack, a pinion mounted upon a crank-arm, a second pinion in mesh therewith and mounted on a shaft arranged transversely of the plane of the rack, an escapement-wheel also mounted on said shaft, and controlling-dogs for said escapement-wheel substantially as set forth.

18. In a type-writing machine, the combination of a power-driven paper-carriage having a feed-rack, a crank-arm having a pinion normally in engagement with said rack, means for vibrating said crank-arm and removing said pinion from said rack, a companion pinion mounted on a shaft arranged transversely of the feed-rack, an escapement-wheel also mounted on said shaft, and controlling-dogs for said escapement-wheel, substantially as set forth.

19. In a type-writing machine, the combination of a power-driven paper-carriage having a feed-rack, a crank-arm bearing a pinion to engage with said rack, a spring connected to said crank-arm for holding said pinion normally in engagement with said feed-rack and for returning it thereto when vibrated, means for vibrating said crank-arm and throwing the pinion out of engagement with the rack, a companion pinion mounted on a cross-shaft, an escapement-wheel also mounted on said shaft, and controlling-dogs for said escapement-wheel, substantially as set forth.

20. In a type-writing machine, the combination of a power-driven paper-carriage having a feed-rack, a crank-arm bearing a pinion, a companion pinion mounted on a cross-shaft containing also a fixed escapement-wheel, controlling-dogs for the latter, a release-key on the carriage, and connections between said release-key and said crank-arm for vibrating the same and throwing the pinion thereon out of engagement with the feed-rack, substantially as set forth.

21. In a type-writing machine, the combination of a power-driven paper-carriage having a feed-rack, a spring-pressed crank-arm bearing a pinion and having a projection, a companion pinion mounted on a cross-shaft bearing also an escapement-wheel, dogs for controlling the latter, an arm for acting on said projection, a lever for acting on said arm, a rocking or tilting bar on the carriage for vibrating said lever, and a release-key for rocking or tilting said bar substantially as set forth.

22. In a type-writing machine, the combination of a paper-carriage having a feed-rack, a cross-shaft having an escapement-wheel and also a pinion, a dog for the latter, a spring-actuated crank-arm loosely mounted on said shaft and having a pinion and a projection, arranged on the opposite side of its axis of motion, an arm for raising said projection, a transverse lever for raising said arm, a longitudinal tilting bar on the carriage for raising said lever, and a release-key lever also on the carriage for raising said tilting bar substantially as set forth.

23. In a type-writing machine, the combination of a power-driven paper-carriage having a feed-rack, a vibratory pinion engaging therewith, a cross-shaft bearing a companion pinion and a vertically-arranged escapement-wheel, a universal bar actuated by the finger-key mechanism, a vertical shaft or spindle connected by a crank-arm at its lower end to said universal bar and bearing at its upper end horizontally-arranged holding and feeding dogs, the feeding-dog having an independent horizontal pivot substantially as set forth.

24. In a type-writing machine, the combination of an adjustable margin stop member, an adjustable line stop member, and a third stop member adapted to normally contact with each of the other two and arrest the carriage in both directions of its travel, and means for separating the said members when contact has been made and moving one out of the path of the other so that a further travel of the carriage may be obtained without disturbing the setting of any stop member; substantially as set forth.

25. In a type-writing machine, the combination of a toothed bar, a margin-stop, and a line-stop thereon, a third stop normally in the path of said stops and adapted to contact with each without first affecting the letter-spacing mechanism or releasing the carriage, the said stops being relatively movable or separable after contact so that a step-over or passing-by action may occur after the arrest of the carriage by the margin-stop and the third stop, and by the line-stop and the third stop; substantially as set forth.

26. In a type-writing machine, the combination of an adjustable margin stop member, an adjustable line stop member, and a third stop member adapted to normally contact with each of the other two without first affecting the letter-spacing mechanism or releasing the carriage and adapted also to be separated therefrom or moved out of their path after contact has been made and the carriage arrested; substantially as set forth.

27. In a type-writing machine, the combination of a carriage having a line-locking contact device, a universal bar, a vertical oscillatory shaft provided with a catch adapted to lock said universal bar and provided also at its upper end with a horizontally-pivoted arm extending into the path of said contact device, whereby after said arm has been vibrated and the line locked it may be lifted to permit the onward movement of said contact device and the carriage for the insertion of additional characters, substantially as set forth.

28. In a type-writing machine, the combination of a carriage having a line-locking contact device, and a horizontal swinging arm projecting in the path thereof and connected to the feeding and printing mechanisms, the said arm being adapted to lock the latter when moved by the contact device and being also adapted to be lifted or swung up vertically out of the path of said contact device to permit the printing of one or more additional characters after the line has once been locked, substantially as set forth.

29. In a type-writing machine, the combination of a carriage having a line-locking contact device adjustable thereupon, and an intercepting-arm having a lateral, horizontal swinging movement and also a vertical swinging movement and connected to the carriage-feeding and printing mechanisms, substantially as set forth.

30. In a type-writing machine, the combination of a carriage having an adjustable line-locking contact device, a vertical oscillatory shaft, an arm pivoted horizontally upon the upper end of said shaft, a returning-spring, a hooked crank-arm at the lower end of said shaft, a longitudinally-sliding universal bar adapted to be engaged by said hooked arm, a release-bar extending longitudinally of the carriage and under said horizontally-pivoted arm, and a release-key for lifting said bar, substantially as set forth.

31. In a type-writing machine, the combination of a carriage having a line-locking contact device, an intercepting liftable arm connected to the printing and carriage-feeding mechanisms and adapted to be struck by said line-locking contact device on the carriage, and a finger-key mechanism for moving said intercepting-arm out of the path of travel of the line-locking contact device after the line has been locked for the purpose of enabling the printing of one or more additional characters, said finger-key mechanism comprising a liftable bar extending longitudinally of the carriage for substantially its whole length, and means for lifting said bar, substantially as set forth.

32. In a type-writing machine, the combination of a carriage having a toothed bar, a carriage-contact adjustably mounted thereon, an arm mounted in the framework and connected to the printing and feeding mechanisms, and having a vertical pivot and a horizontal pivot, a bar arranged longitudinally on said carriage, and a transversely-arranged key-lever for lifting said bar and said arm and releasing the latter after the said arm has been actuated by the carriage contact device and the locking of the printing and feeding mechanisms has occurred; substantially as set forth.

33. In a type-writing machine, the combination of a carriage provided with a plurality of adjustable carriage contact-stops, a horizontally-pivoted arm connected to the framework arranged at right angles to the travel of the carriage and projecting forwardly into the path of said stops and adapted to be struck on one side by one of said stops and on the other side by the other of said stops, and adapted to be lifted to escape either of said stops and permit of further movement of the carriage in either direction, after it has been arrested by contact of either of said stops with said arm; substantially as set forth.

34. In a type-writing machine, the combination of a carriage having a bell-tripping contact device, a bell-operating arm or lever mounted on the framework, a bell, a pivoted hammer therefor, and a connecting-rod between said hammer and said operating-lever and slidably connected to the hammer, whereby the alarm is sounded only on the forward movement of the carriage; substantially as set forth.

35. In a type-writing machine, the combination of a carriage having an adjustable bell-tripping contact device, an operating lever or arm pivoted to the framework, a bell, a pivoted hammer therefor, and a connecting-rod attached at one end to said operating-lever and having a slotted connection at its other end to said hammer; substantially as set forth.

36. In a type-writing machine, the combination of carriage feeding and printing mechanisms, a vertical oscillatory shaft having a catch at its lower end to engage the universal bar, and a forwardly-projecting arm at its upper end, a bell mechanism, and an adjustable contact-piece or projection mounted upon said carriage, whereby the same part is adapted to cause the alarm to be given, the carriage to be arrested and the printing mechanism to be locked; substantially as set forth.

37. In a type-writing machine, the combination of a carriage, an adjustable marginal contact device thereon, an overhanging horizontally-pivoted arm connected to the framework and extending into the path of movement of said carriage contact device, whereby the carriage is arrested when moving from left to right; substantially as set forth.

38. In a type-writing machine, the combination of a carriage provided with an adjustable marginal contact device, an overhanging horizontally-pivoted arm connected to the framework and projecting into the path of said contact device to limit the recession of the carriage, and an abutment for supporting said arm; substantially as set forth.

39. In a type-writing machine, the combination of a carriage provided with an adjustable marginal contact device, an overhanging pivoted arm on the framework projecting normally into the path thereof and to be struck thereby to arrest the carriage in its return movement, and a key mechanism on the carriage for swinging said arm up out of the path of said contact device after the carriage has been arrested for the purpose of permitting the impression of characters within the margin; substantially as described.

40. In a type-writing machine, the combination of a carriage having a contact device, and a frame contact device normally in the path thereof and having a laterally-swinging and also a vertically-swinging movement, each movement being at right angles to the other; substantially as set forth.

41. In a type-writing machine, the combination with the back bar of a carriage-frame provided with a series of teeth, of a slide provided with a projection and with a transverse slot on its upper side, a spring-actuated dog having a shank which slides between the top of said bar and the under side of said slide at right angles to said bar and to the movement of the slide thereon, and a finger-piece on said shank which projects up through said transverse slot and is adapted to slide endwise therein; substantially as described.

42. In a type-writing machine, the combination of a feed rack-bar having at one edge a series of teeth, a slide thereon having a projection and a transverse slot, a spring-actuated dog having a shank arranged to slide between the top of said feed rack-bar and the under side of said slide at right angles to said bar and to the movement of the slide thereon, and a finger-piece on said shank projecting in a direction opposite to that of said dog and up through said transverse slot; substantially as described.

43. In a type-writing machine, the combination of a carriage-bar having a series of beveled teeth at one edge thereof, a slide dovetailed upon said bar and provided with a projection and a transverse slot, a dog having a shank arranged between the top of the bar and the under side of said slide and adapted to slide at right angles to said slide and to said bar, a finger-piece at the opposite end of said shank and projecting in a direction opposite to that of said dog and extending out through said slot, and a flat spring attached at one end to said slide and connected at its other free end to said dog; substantially as described.

44. In a type-writing machine, the combination with the paper-carriage and its feeding mechanism, of two contact devices, one arranged upon the framework and the other upon the carriage, to arrest the step-by-step feeding of the carriage at the end of a predetermined line, the frame contact device being movable out of the plane or path of the other after the arrest of the carriage, and a key mechanism arranged on the carriage and connected to said movable frame contact device, so as to remove it from its associated contact device after the stoppage of the carriage and without releasing the carriage-feeding mechanism and thereby permit a further feeding of the carriage and the printing of additional characters; substantially as set forth.

45. In a type-writing machine, the combination with a paper-carriage and its feeding mechanism, of an adjustable contact device on the carriage, a vertically-movable contact-arm on the framework, and a pivoted bar arranged beneath and at right angles to said arm and a key-lever on said carriage to swing said bar and said arm upwardly; substantially as set forth.

46. In a type-writing machine, the combination with a paper-carriage and its feeding mechanism, of two contact devices, one on the carriage and the other on the framework and normally in the path of each other to stop the step-by-step feed of the carriage, one of said contact devices being independently movable, and the carriage contact device being adapted to strike the frame contact device on both of its sides, whereby the carriage may be arrested, in moving in both directions, by the same devices; substantially as set forth.

47. In a type-writing machine, the combination with the paper-carriage and its feeding and printing mechanisms, of a plurality of contact devices on one part of the machine, and a single contact device on another part of the machine adapted to said plurality of contact devices, the contact devices employed being relatively adjustable and operating to arrest the step-by-step feed of the carriage and lock the printing mechanism a plurality of times in one movement of the carriage from right to left, the construction and arrangement being such that a plurality of columns, variable in width as may be desired, may thereby be accurately and conveniently produced; substantially as set forth.

48. In a type-writing machine, the combination with a paper-carriage, of a plurality of marginal contact devices on one part of the machine, a single contact device on another part of the machine, and normally in the path of the plurality of contact devices, the said contact devices operating to arrest the return movement of the carriage at a plurality of points and thereby facilitate the writing of any number of lines to be written in any of the plurality of columns determined by said contact devices; substantially as set forth.

49. In a type-writing machine, the combination with a paper-carriage, of a plurality of contact devices on one part of the machine, a single contact device on another part of the machine, the said contact devices being normally in the path of each other and adapted to arrest the carriage a plurality of times in either direction of its travel, and a key for actuating the movable contact device to permit the continued feed of the carriage after each stoppage; substantially as set forth.

50. In a type-writing machine, the combination of a bell mechanism, and a carriage having a plurality of adjustable contact devices, normally in the path of a relatively stationary contact and each adapted to stop the carriage in either direction and to operate the bell or alarm prior to stopping the carriage in its feeding movement at the right-hand end of a full line or column line, substantially as set forth.

51. In a type-writing machine, the combination of a bell mechanism, a carriage having a plurality of adjustable contact devices adapted to stop the carriage and ring the bell a plurality of times during the forward movement of the carriage, and a key for releasing the carriage after such stoppages; substantially as set forth.

52. In a type-writing machine, the combination of a carriage having a contact device, a frame contact device having a vertical pivot and also a horizontal pivot, means for swinging said frame contact device about its horizontal pivot to disengage it from the carriage contact device, and a spring connected to said frame contact device to swing it about its vertical pivot, and return the same to its normal position; substantially as set forth.

53. In a type-writing machine, the combination with the carriage, the printing mechanism, and the alarm mechanism, of an adjustable contact device on the carriage adapted to first actuate the alarm and then lock the printing mechanism, and a contact device on the framework connected to the printing mechanism and adapted to coöperate with the contact device on the carriage and also arrest the carriage on its return movement; substantially as set forth.

54. In a type-writing machine, the combination of a paper-carriage and its feeding or escapement mechanism, a line-locking device connected therewith, a release-key on said carriage adapted to release the carriage from the feeding or escapement mechanism by a full movement and to unlock the line-locking device by a partial movement; substantially as set forth.

55. In a type-writing machine, the combination with a movable stop arranged on the framework and connected to the printing and feeding mechanisms, and with a bell mechanism, of a paper-carriage provided with a plurality of adjustable contact devices each adapted to arrest the carriage in either direction of its travel, each adapted to operate the alarm or bell mechanism, and each adapted to lock the printing mechanism on the advance movements of the carriage; substantially as set forth.

56. In a type-writing machine, the combination of a carriage having an adjustable bell-tripping contact device, a bell-operating arm or lever mounted on the framework, a bell, a pivoted hammer, and a slotted connecting-rod attached thereto and pivoted to said operating arm or lever; substantially as set forth.

57. In a type-writing machine, the combination with the bell and bell-hammer, and means for actuating the same, of a spring-pressed pin substantially as described for causing the hammer to rebound after striking the bell; substantially as set forth.

58. In a type-writing machine, the combination of an inking-ribbon, a pair of bilobed gears, a pawl-and-ratchet mechanism for driving the same, a crank or eccentric, a connecting-rod, a rocker-arm, a rock-shaft, a second rocker-arm, a ribbon-carrier, and a ribbon-spool; substantially as set forth.

59. In a type-writing machine, the combination of an inking-ribbon, a carriage-driving drum, a ratchet-wheel arranged axially thereof, a driving-pawl arranged to turn with said drum, a bilobed gear arranged axially of said ratchet-wheel, a companion bilobed gear on a separate axis, a crank or eccentric mounted on the said axis, a connecting-rod attached at one end to the wrist-pin thereof and at its other end to a rocking lever which in turn is attached to a sliding carrier, and a ribbon-spool adapted to slide back and forth with said carrier; substantially as set forth.

60. In a type-writing machine, the combination of an inking-ribbon, a ribbon-spool, a ribbon-carrier, an angle-lever connected to the latter, a pitman or connecting-rod attached to the said lever at one end and to a wrist-pin at the other end, a pair of driving-gears, a ratchet-wheel pivoted to said gears, and a driving-pawl for said ratchet-wheel connected to the rotatory carriage-driving drum; substantially as set forth.

61. In a type-writing machine, the combination of an inking-ribbon, a pair of ribbon-spools, a pair of ribbon-carriers adapted to slide upon a pair of fixed shafts, a pair of upright rocker-arms, a horizontal rock-shaft connecting said arms together, a carriage-driving drum, a driving-pawl thereon, a ratchet-wheel mounted axially of said drum to be driven by said pawl when the drum revolves in one direction, a pair of bilobed gears driven by said ratchet-wheel, a crank, a vertically-arranged connecting-rod, and a horizontally-arranged rocker-arm attached to said rock-shaft; substantially as set forth.

62. In a type-writing machine, the combination of an inking-ribbon, a pair of ribbon-spools having ratchet-wheels and adapted to both rotate and move longitudinally, a pair of ribbon-carriers connected to said spools and having also an endwise movement, a pair of spool-driving pawls adapted to alternately rotate said spools, and means mounted upon said ribbon-carriers for alternately moving said pawls into engagement with said spools, said means being controlled by the ribbon upon the spools and operative only when one of said spools is empty and during an endwise movement thereof; substantially as set forth.

63. In a type-writing machine, the combination of an inking-ribbon, a pair of ribbon-spools adapted to both rotate and move longitudinally, a pair of ribbon-carriers connected to said spools and having also an endwise movement, a pair of spool-driving pawls adapted to engage the ratchet-wheels on said spools, means for preventing both of said driving-pawls from being in engagement with their associated spools at the same time, a vertically-movable pawl-actuator arranged exteriorly at each ribbon-spool adapted to be lifted gradually when the spool takes on the ribbon and adapted to descend gradually as the spool pays off the ribbon, the construction and arrangement being such that when the pawl-actuator on one spool is rising during the rotation thereof the other pawl-actuator is descending, and such that when the descent of the latter is completed or when the ribbon is entirely unwound from its spool the said actuator is brought to a plane or position whereat it is capable of moving its associated driving-pawl into engagement with its ratchet-wheel and to simultaneously move the opposite driving-pawl out of engagement with its ratchet-wheel, whereby the movement of the ribbon in the direction of its length may be automatically reversed, substantially as set forth.

64. In a type-writing machine, the combination of an inking-ribbon, a pair of ribbon-spools having ratchet-wheels and adapted both to rotate and to move longitudinally, a pair of pivoted hooks connected to travel with said spools in their longitudinal movements and adapted to be vibrated about their pivots by the increase and decrease of ribbon upon said spools, a pair of driving-pawls adapted to alternately revolve said spools step by step during their longitudinal movements, means for keeping one of said driving-pawls out of engagement with its associated ratchet-wheel when the other is in engagement and is winding the ribbon upon its associated ribbon-spool, the arrangement being such that the disengaged driving-pawl may be thrown into engagement with its ratchet-wheel, when the ribbon on the spool of the latter has been entirely discharged, and the opposite driving-pawl simultaneously disengaged from its ratchet-wheel, substantially as set forth.

65. In a type-writing machine, the combination of an inking-ribbon, a pair of ribbon-spools having ratchet-wheels and adapted to rotate and to move endwise, a pair of connected driving-pawls adapted to alternately rotate said spools step by step in their endwise movements, a pair of ribbon-carriers connected to said spools and having each an exteriorly-arranged driving-pawl actuator controlled by the winding and unwinding of the ribbon on the spools, the said actuators being arranged to simultaneously work in opposite directions, one moving outwardly as its spool takes on ribbon, and the other inwardly as its spool pays off ribbon, so that when the latter spool is exhausted the said actuator may be brought to a position to operate upon its driving-pawl and effect an engagement thereof with its ratchet-wheel and to simultaneously effect a disengagement between the other ratchet-wheel and its driving-pawl, substantially as set forth.

66. In a type-writing machine, the combination of an inking-ribbon, a pair of ribbon-spools having ratchet-wheels, and adapted to rotate and also to move endwise, a pair of ribbon-carriers adapted to move with said spools, a pair of hooks pivotally connected to said carriers and provided each with a finger adapted to ride upon the ribbon on the spool and thereby vibrate said hooks, and a pair of connected driving-pawls adapted to alternately rotate said spools and be thrown into and out of operative relation thereto by the said hooks, substantially as set forth.

67. In a type-writing machine, the combination of an inking-ribbon, a pair of ribbon-spools having ratchet-wheels and adapted both to rotate and to move endwise, a pair of ribbon-carriers adapted to move with said spools, an arm pivoted to each of said carriers and provided with a pivoted hook and a finger adapted to ride upon the ribbon on the spool, and a pair of connected driving-pawls adapted to be alternately engaged with their respective ratchet-wheels by means of said hooks and when said ribbon-spools are alternately emptied, substantially as set forth.

68. In a type-writing machine, the combination of an inking-ribbon, a pair of ribbon-spools having ratchet-wheels and adapted both to rotate and move endwise, a pair of ribbon-carriers connected to move with the ribbon-spools, a pair of hooks pivotally connected to said carriers and provided each with a finger adapted to ride upon the ribbon on its associated spool, stops for limiting the descent of said hooks, and a pair of connected driving-pawls adapted to be alternately thrown into engagement with their ratchet-wheels by engagement therewith of the said hooks and during the endwise movements of said carriers, substantially as set forth.

69. In a type-writing machine, the combination of an inking-ribbon, a pair of ribbon-spools having ratchet-wheels and adapted both to rotate and move endwise, a ribbon-carrier embracing each spool and adapted to move therewith, an arm pivoted to each said carrier, a hook pivoted to said arm, a finger rigidly connected to said arm and adapted to ride upon the ribbon on the spool to effect the vibration of said hook, and a pair of connected driving-pawls adapted to be alternately actuated by said hooks, substantially as set forth.

70. In a type-writing machine, the combination of an inking-ribbon, a pair of ribbon-spools having ratchet-wheels and adapted both to rotate and move endwise, a ribbon-carrier embracing each spool and adapted to move therewith, each said carrier having a pivoted hook and a stop to limit the descent thereof, a finger connected to said hook and adapted to control its pivotal movements by contact with the ribbon on the spool, and a pair of connected driving-pawls adapted to be alternately actuated by said hook, substantially as set forth.

71. In a type-writing machine, the combination of an inking-ribbon, a pair of ribbon-spools having ratchet-wheels and adapted both to rotate and move endwise, a ribbon-carrier connected to move with each said ribbon-spool, said carrier having a vertical plate and flanges to form a ribbon-guide, said plate having a cutaway and a stop, an arm pivotally connected to said carrier, a hook pivoted to said arm and provided with a finger to ride upon the ribbon on the spool, and a pair of connected driving-pawls adapted to be alternately actuated by said pivoted hooks, substantially as set forth.

72. In a type-writing machine, the combination of an inking-ribbon, a pair of ribbon-spools having ratchet-wheels and adapted both to rotate and move endwise, a pair of pivoted driving-pawls for said ratchet-wheels, one of said driving-pawls having a projection extending below the pivot, a rocker-arm engaging with said projection on its outer side, another rocker-arm engaging with the other driving-pawl above its pivot and on the inner side of said pawl, and a rock-shaft connecting said rocker-arms together, substantially as set forth.

73. In a type-writing machine, the combination of an inking-ribbon, a pair of ribbon-spools having ratchet-wheels and adapted both to rotate and move endwise, a pair of pivoted driving-pawls for said ratchet-wheels, one of said driving-pawls having a projection extending below the pivot, a rocker-arm engaging with said projection on its outer side, another rocker-arm engaging with the other driving-pawl above its pivot and on the inner side of said pawl, a rock-shaft connecting said rocker-arms together, and a catch mechanism for holding said parts in either of the two positions to which they may be moved, substantially as set forth.

74. In a type-writing machine, the combination of an inking-ribbon, a pair of ribbon-spools having ratchet-wheels and adapted both to rotate and move endwise, a pair of pivoted driving-pawls to alternately rotate said spools, one of said driving-pawls having a projection extending below its pivot, a rocker-arm acting on the outer side of said projection, another rocker-arm acting on the inner side of the other driving-pawl and above its pivot, a rock-shaft connecting said rocker-arms together, and a spring-pressed cam adapted to act against a relatively-fixed catch or abutment and adapted to lock and unlock the parts automatically as the said rocker-arms are vibrated, substantially as set forth.

75. In a type-writing machine, the combination of a pair of connected rocker-arms arranged to simultaneously move a pair of pivoted ribbon-spool-driving pawls in opposite directions, a spring-arm connected to said rocker-arms, a cam thereon, and a relatively-fixed roller to coöperate with said cam, substantially as set forth.

76. In a type-writing machine, the combination of an inking-ribbon, a pair of ribbon-spools having ratchet-wheels adapted to rotate and move endwise, a pair of pivoted spool-rotating driving-pawls tending always to engage with their ratchet-wheels, a transverse rock-shaft underlying said pawls and provided at its ends with rocker-arms which vibrate in the same direction and bear on said driving-pawls, substantially as set forth.

77. In a type-writing machine, the combination of an inking-ribbon, a pair of ribbon-spools adapted to rotate and move endwise and having ratchet-wheels, a pair of ribbon-carriers connected to said spools, means for moving said ribbon-spools and ribbon-carriers back and forth in the direction of the width of the ribbon, a pair of alternately-acting driving-pawls for said ribbon-spools, means connecting said driving-pawls together and holding one of them out of engagement while the other is operating to turn its spool and move the ribbon lengthwise while the ribbon is moving widthwise, and a pair of driving-pawl actuators on said ribbon-carriers having riders to travel upon the coils of the ribbon on said spools and control said actuators and move them simultaneously in opposite directions and cause them to alternately actuate their respective driving-pawls upon the discharge of the ribbon from their respective spools and thereby effect automatically a reversal of the longitudinal movement of the ribbon, substantially as set forth.

78. In a type-writing machine, the combination of an inking-ribbon, a pair of ribbon-spools, a pair of reciprocatory ribbon-carriers, means for moving the ribbon from one spool to the other, means for automatically reversing the longitudinal direction of movement of the inking-ribbon, the said last-mentioned means including fingers mounted on the reciprocatory ribbon-carriers and adapted to ride upon the outside of the ribbon as it is wound upon and unwound from the spools, pawl-actuators attached to and movable with said fingers so as to be controlled thereby, and driving-pawls adapted to be alternately engaged with their respective ratchet-wheels by the direct engagement therewith of said pawl-actuators; substantially as set forth.

79. In a type-writing machine, as a means for preventing the inking-ribbon from being wound upon its spool in the wrong direction, a device adapted to ride up and down upon the ribbon as the coils increase and diminish and adapted when the ribbon is entirely unwound from the spool to engage with and lock the spool against further rotation in the same direction, whereby the rewinding of the ribbon upon said spool must be commenced by turning said spool in the reverse direction, substantially as set forth.

80. In a type-writing machine, as a means for preventing the inking-ribbon from winding upon its spool in the wrong direction, a slot formed in said spool, and a stop adapted to ride upon the ribbon and to drop into said slot when the ribbon is unwound and to prevent any further rotation of said spool in the same direction, substantially as set forth.

81. In a type-writing machine, the combination of an inking-ribbon, a pair of ribbon-spools, each having a slot, driving-pawls and ratchet-wheels for rotating said spools, means for moving said spools and the ribbon crosswise, pivoted hooks adapted to alternately actuate said driving-pawls and provided each with means adapted to ride upon the ribbon on the spool to control the said hooks and to also check the further rotation of the spool in the same direction when exhausted of its ribbon, substantially as set forth.

82. In a type-writing machine, the combination with a ribbon-spool having an opening, a longitudinally-traveling ribbon, and switch or shifting mechanism, of a finger or rider connected to the latter and arranged to travel upon the coils of the ribbon and to drop into said opening in the spool when the latter is emptied, whereby the reversing action may take place immediately the spool is exhausted, substantially as set forth.

83. In a type-writing machine, and in a ribbon-reversing mechanism, the combination of a ribbon-spool, a driving-pawl therefor, a ribbon, and a gravitating pawl-actuator having a finger adapted to ride upon the coils of the ribbon as it is unwound from said spool, thus enabling the said pawl-actuator to gradually descend to the plane of the said driving-pawl, the said spool being so constructed that when the ribbon is unwound the said finger and pawl-actuator may have a sudden drop or movement toward the axis of the spool; substantially as set forth.

84. In a type-writing machine, the combination of an adjustable margin stop member, an adjustable line stop member, means for contacting with the opposing faces of said stop members, thereby confining the travel of the carriage normally between said stop members, and means for separating the contacting members when the carriage has been arrested at either end and thereby permitting a further travel of the carriage and printing beyond both said stop members; the said separating means being arranged and adapted to act for both ends of the line, substantially as set forth.

85. In a type-writing machine, the combination of a power-driven paper-carriage having a feed-rack, a pinion normally in engagement therewith and having a vibratory movement into and out of engagement with said feed-rack, and a dog-controlled escapement-wheel connected to said pinion and in such a manner that the vibratory movements of the pinion into and out of engagement with the feed-rack are effected without disturbing the relationship between the escapement-wheel and the dogs, substantially as set forth.

86. In a type-writing machine, the combination of a power-driven paper-carriage having a feed-rack, a pinion normally in engagement therewith, a vibratory arm or device on which said pinion is mounted, a dog-controlled escapement-wheel, a release-key connected to vibrate said pinion in one direction and out of said rack, and a spring for vibrating said pinion in the opposite direction and restoring said engagement, substantially as set forth.

Signed at Syracuse, in the county of Onondaga and State of New York, this 28th day of November, A. D. 1894.

ALEXANDER T. BROWN.

Witnesses:
D. B. WOODFORD,
I. S. BARRY.